US008676577B2

(12) United States Patent
Jablokov et al.

(10) Patent No.: US 8,676,577 B2
(45) Date of Patent: Mar. 18, 2014

(54) USE OF METADATA TO POST PROCESS SPEECH RECOGNITION OUTPUT

(75) Inventors: Igor Roditis Jablokov, Charlotte, NC (US); Clifford J. Strohofer, III, Charlotte, NC (US); Marc White, Charlotte, NC (US); Victor Roditis Jablokov, Charlotte, NC (US)

(73) Assignee: Canyon IP Holdings, LLC, Wilmington, DE (US)

( * ) Notice: Subject to any disclaimer, the term of this patent is extended or adjusted under 35 U.S.C. 154(b) by 682 days.

(21) Appl. No.: 12/415,874

(22) Filed: Mar. 31, 2009

(65) Prior Publication Data

US 2009/0248415 A1 Oct. 1, 2009

Related U.S. Application Data

(60) Provisional application No. 61/041,220, filed on Mar. 31, 2008.

(51) Int. Cl.
*G10L 15/00* (2013.01)

(52) U.S. Cl.
USPC ........... 704/235; 704/251; 704/252; 704/253; 704/254; 704/257; 704/270; 704/275

(58) Field of Classification Search
USPC .................. 704/235, 251–254, 257, 270, 275
See application file for complete search history.

(56) References Cited

U.S. PATENT DOCUMENTS

| | | | |
|---|---|---|---|
| 5,675,507 A | | 10/1997 | Bobo, II |
| 5,864,603 A | * | 1/1999 | Haavisto et al. ........... 379/88.01 |
| 5,974,413 A | * | 10/1999 | Beauregard et al. .................. 1/1 |
| 6,173,259 B1 | | 1/2001 | Bijl et al. |
| 6,219,638 B1 | | 4/2001 | Padmanabhan et al. |
| 6,490,561 B1 | | 12/2002 | Wilson et al. |

(Continued)

FOREIGN PATENT DOCUMENTS

| | | |
|---|---|---|
| EP | 1274222 A2 | 1/2003 |
| WO | 2006101528 A1 | 9/2006 |

OTHER PUBLICATIONS

David H. Kemsley, et al., A Survey of Neural Network Research and Fielded Applications, 1992, in International Journal of Neural Networks: Research and Applications, vol. 2, No. 2/3/4, pp. 123-133. Accessed Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf, 12 pages total.

(Continued)

*Primary Examiner* — Pierre-Louis Desir
*Assistant Examiner* — Fariba Sirjani
(74) *Attorney, Agent, or Firm* — Knobbe Martens Olson & Bear LLP

(57) ABSTRACT

A method of utilizing metadata stored in a computer-readable medium to assist in the conversion of an audio stream to a text stream. The method compares personally identifiable data, such as a user's electronic address book and/or Caller/Recipient ID information (in the case of processing voice mail to text), to the n-best results generated by a speech recognition engine for each word that is output by the engine. A goal of this comparison is to correct a possible misrecognition of a spoken proper noun such as a name or company with its proper textual form or a spoken phone number to correctly formatted phone number with Arabic numerals to improve the overall accuracy of the output of the voice recognition system.

49 Claims, 23 Drawing Sheets

(56) References Cited

U.S. PATENT DOCUMENTS

| | | | |
|---|---|---|---|
| 6,519,562 B1* | 2/2003 | Phillips et al. | 704/240 |
| 6,532,446 B1* | 3/2003 | King | 704/270.1 |
| 6,654,448 B1 | 11/2003 | Agraharam et al. | |
| 6,687,339 B2 | 2/2004 | Martin | |
| 6,687,689 B1 | 2/2004 | Fung et al. | |
| 6,775,360 B2 | 8/2004 | Davidson et al. | |
| 6,816,578 B1 | 11/2004 | Kredo et al. | |
| 6,820,055 B2 | 11/2004 | Saindon et al. | |
| 6,895,084 B1 | 5/2005 | Saylor et al. | |
| 7,062,435 B2* | 6/2006 | Tzirkel-Hancock et al. | 704/241 |
| 7,200,555 B1 | 4/2007 | Ballard et al. | |
| 7,206,932 B1 | 4/2007 | Kirchhoff | |
| 7,225,224 B2 | 5/2007 | Nakamura | |
| 7,233,655 B2 | 6/2007 | Gailey et al. | |
| 7,236,580 B1 | 6/2007 | Sarkar et al. | |
| 7,254,384 B2 | 8/2007 | Gailey et al. | |
| 7,302,280 B2 | 11/2007 | Hinckley et al. | |
| 7,319,957 B2* | 1/2008 | Robinson et al. | 704/252 |
| 7,324,942 B1* | 1/2008 | Mahowald et al. | 704/270 |
| 7,328,155 B2* | 2/2008 | Endo et al. | 704/251 |
| 7,475,404 B2* | 1/2009 | Hamel | 719/317 |
| 7,640,160 B2* | 12/2009 | Di Cristo et al. | 704/257 |
| 7,680,661 B2* | 3/2010 | Co et al. | 704/251 |
| 7,685,509 B1* | 3/2010 | Clark et al. | 715/224 |
| 7,707,163 B2* | 4/2010 | Anzalone et al. | 707/999.107 |
| 7,747,437 B2* | 6/2010 | Verhasselt et al. | 704/257 |
| 7,769,764 B2* | 8/2010 | Ramer et al. | 707/751 |
| 7,822,610 B2* | 10/2010 | Burns et al. | 704/270.1 |
| 7,852,993 B2* | 12/2010 | Ju et al. | 379/88.02 |
| 7,890,329 B2* | 2/2011 | Wu et al. | 704/257 |
| 7,904,301 B2* | 3/2011 | Densham et al. | 704/500 |
| 7,907,705 B1* | 3/2011 | Huff et al. | 379/88.14 |
| 7,908,141 B2* | 3/2011 | Belknap | 704/235 |
| 7,908,273 B2* | 3/2011 | DiMaria et al. | 707/736 |
| 7,949,529 B2* | 5/2011 | Weider et al. | 704/270 |
| 7,957,975 B2* | 6/2011 | Burns et al. | 704/275 |
| 7,970,610 B2* | 6/2011 | Downey | 704/246 |
| 8,010,358 B2* | 8/2011 | Chen | 704/246 |
| 8,069,047 B2* | 11/2011 | Cross et al. | 704/270.1 |
| 8,073,700 B2* | 12/2011 | Jaramillo et al. | 704/270.1 |
| 8,117,268 B2* | 2/2012 | Jablokov et al. | 709/206 |
| 8,121,838 B2* | 2/2012 | Kobal et al. | 704/235 |
| 8,140,632 B1* | 3/2012 | Jablokov et al. | 709/206 |
| 8,145,485 B2* | 3/2012 | Brown | 704/240 |
| 8,380,511 B2* | 2/2013 | Cave et al. | 704/270 |
| 2002/0087330 A1* | 7/2002 | Lee et al. | 704/500 |
| 2003/0008661 A1 | 1/2003 | Joyce et al. | |
| 2003/0050778 A1 | 3/2003 | Nguyen et al. | |
| 2003/0115060 A1* | 6/2003 | Junqua et al. | 704/235 |
| 2003/0126216 A1 | 7/2003 | Avila et al. | |
| 2003/0149566 A1* | 8/2003 | Levin et al. | 704/256 |
| 2004/0005877 A1* | 1/2004 | Vaananen | 455/412.1 |
| 2004/0015547 A1 | 1/2004 | Griffin et al. | |
| 2004/0019488 A1* | 1/2004 | Portillo | 704/275 |
| 2004/0133655 A1 | 7/2004 | Yen et al. | |
| 2004/0151358 A1 | 8/2004 | Yanagita et al. | |
| 2005/0004799 A1* | 1/2005 | Lyudovyk | 704/254 |
| 2005/0010641 A1 | 1/2005 | Staack | |
| 2005/0021344 A1 | 1/2005 | Davis et al. | |
| 2005/0080786 A1* | 4/2005 | Fish et al. | 707/10 |
| 2005/0101355 A1* | 5/2005 | Hon et al. | 455/563 |
| 2005/0154587 A1* | 7/2005 | Funari et al. | 704/247 |
| 2005/0187768 A1* | 8/2005 | Godden | 704/238 |
| 2005/0197145 A1 | 9/2005 | Chae et al. | |
| 2005/0197840 A1* | 9/2005 | Wang et al. | 704/260 |
| 2005/0209868 A1 | 9/2005 | Wan et al. | |
| 2005/0266884 A1* | 12/2005 | Marriott et al. | 455/558 |
| 2005/0288926 A1 | 12/2005 | Benco et al. | |
| 2006/0004570 A1* | 1/2006 | Ju et al. | 704/243 |
| 2006/0009974 A1* | 1/2006 | Junqua et al. | 704/243 |
| 2006/0052127 A1 | 3/2006 | Wolter | |
| 2006/0074895 A1* | 4/2006 | Belknap | 707/4 |
| 2006/0075055 A1* | 4/2006 | Littlefield | 709/206 |
| 2006/0143007 A1* | 6/2006 | Koh et al. | 704/243 |
| 2006/0159507 A1* | 7/2006 | Jawerth et al. | 400/472 |
| 2006/0235684 A1* | 10/2006 | Chang | 704/233 |
| 2007/0005368 A1* | 1/2007 | Chutorash et al. | 704/275 |
| 2007/0061146 A1* | 3/2007 | Jaramillo et al. | 704/270 |
| 2007/0061148 A1* | 3/2007 | Cross et al. | 704/275 |
| 2007/0079383 A1 | 4/2007 | Gopalakrishnan | |
| 2007/0106506 A1* | 5/2007 | Ma et al. | 704/231 |
| 2007/0115845 A1 | 5/2007 | Hochwarth et al. | |
| 2007/0118374 A1* | 5/2007 | Wise et al. | 704/235 |
| 2007/0180718 A1 | 8/2007 | Fourquin et al. | |
| 2007/0239837 A1* | 10/2007 | Jablokov et al. | 709/206 |
| 2008/0037720 A1* | 2/2008 | Thomson et al. | 379/88.01 |
| 2008/0040683 A1 | 2/2008 | Walsh | |
| 2008/0065737 A1 | 3/2008 | Burke et al. | |
| 2008/0077406 A1* | 3/2008 | Ganong, III | 704/251 |
| 2008/0091426 A1* | 4/2008 | Rempel et al. | 704/251 |
| 2008/0133232 A1* | 6/2008 | Doulton | 704/235 |
| 2008/0154600 A1* | 6/2008 | Tian et al. | 704/251 |
| 2008/0155060 A1 | 6/2008 | Weber et al. | |
| 2008/0177551 A1* | 7/2008 | Schalk | 704/275 |
| 2008/0195588 A1 | 8/2008 | Kim et al. | |
| 2008/0198981 A1 | 8/2008 | Skakkebaek et al. | |
| 2008/0208582 A1* | 8/2008 | Gallino | 704/251 |
| 2008/0221897 A1* | 9/2008 | Cerra et al. | 704/270.1 |
| 2008/0243504 A1* | 10/2008 | Poi | 704/247 |
| 2008/0261564 A1 | 10/2008 | Logan | |
| 2008/0275864 A1 | 11/2008 | Kim et al. | |
| 2008/0317219 A1* | 12/2008 | Manzardo | 379/88.01 |
| 2009/0055175 A1* | 2/2009 | Terrell et al. | 704/235 |
| 2009/0055179 A1* | 2/2009 | Cho et al. | 704/246 |
| 2009/0076821 A1* | 3/2009 | Brenner et al. | 704/260 |
| 2009/0076917 A1* | 3/2009 | Jablokov et al. | 705/14 |
| 2009/0083032 A1* | 3/2009 | Jablokov et al. | 704/235 |
| 2009/0100050 A1* | 4/2009 | Erol et al. | 707/5 |
| 2009/0124272 A1* | 5/2009 | White et al. | 455/466 |
| 2009/0150156 A1* | 6/2009 | Kennewick et al. | 704/257 |
| 2009/0163187 A1 | 6/2009 | Terrell, II | |
| 2009/0182559 A1* | 7/2009 | Gerl et al. | 704/235 |
| 2009/0182560 A1* | 7/2009 | White | 704/235 |
| 2009/0199101 A1* | 8/2009 | Cross et al. | 715/728 |
| 2009/0204410 A1* | 8/2009 | Mozer et al. | 704/275 |
| 2009/0228274 A1* | 9/2009 | Terrell et al. | 704/235 |
| 2009/0240488 A1 | 9/2009 | White et al. | |
| 2009/0248415 A1* | 10/2009 | Jablokov et al. | 704/251 |
| 2009/0276215 A1 | 11/2009 | Hager | |
| 2010/0049525 A1 | 2/2010 | Paden | |
| 2010/0058200 A1* | 3/2010 | Jablokov et al. | 715/752 |
| 2010/0121629 A1* | 5/2010 | Cohen | 704/2 |
| 2010/0145700 A1* | 6/2010 | Kennewick et al. | 704/257 |
| 2010/0182325 A1 | 7/2010 | Cederwall et al. | |
| 2010/0278453 A1 | 11/2010 | King | |
| 2010/0286901 A1* | 11/2010 | Geelen et al. | 701/200 |
| 2011/0054900 A1* | 3/2011 | Phillips et al. | 704/235 |
| 2011/0144973 A1* | 6/2011 | Bocchieri et al. | 704/2 |
| 2012/0022875 A1* | 1/2012 | Cross et al. | 704/275 |
| 2012/0046950 A1* | 2/2012 | Jaramillo et al. | 704/270.1 |
| 2013/0041667 A1* | 2/2013 | Longe et al. | 704/251 |

OTHER PUBLICATIONS

Transl8it! translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

Web-based Telephony Bridges for the Deaf, Glaser et al., 5 pages total.

SoftBridge: An Architecture for Building IP-based Bridges over the Digital Divide, Lewis et al., 5 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Fielding, et al., Hypertext Transfer Protocol—HTTP/1.1, RFC 2616, Network Working Group, sections 7, 9.5, 14.30, 12 pages total.

(56) References Cited

OTHER PUBLICATIONS

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions/ on Jul. 25, 2008, 7 pages total.

Information Disclosure Statement (IDS) Letter Regarding Common Patent Application(s) submitted by Applicant on Jul. 21, 2009.

Information Disclosure Statement (IDS) Letter Regarding Common Patent Application(s) dated Jul. 21, 2011.

Information Disclosure Statement (IDS) Letter Regarding Common Patent Application(s), dated Dec. 6, 2010.

Kimura, K., Suzuoka, T., Amano, S., 1992, Association-based natural language processing with neural networks, In proceedings of the 7th annual meeting of the Association of Computational Linguistics, pp. 223-231.

Bisani, M., Vozila, P., Divay, O., Adams, J., 2008, Automatic editing in a back-end speech-to-text system, 7 pages.

Brown, E., Coden, A., 2002, Capitalization Recovery for Text, Springer-Verlag Berlin Heidelberg, 12 pages.

Huang, J., Zweig, G., Padmanabhan, M., 2002, Extracting caller information from voicemail, Springer-Verlag Berlin Heidelberg, 11 pages.

Delilets, A., Bruijn, B., Martin, J., 2002, Extracting keyphrases from spoken audio documents, Springer-Verlag Berlin Heidelberg, 15 pages.

Information Disclosure Statement (IDS) Letter Regarding Common Patent Application(s), Dated Jun. 4, 2010.

Information Disclosure Statement (IDS) Letter Regarding Common Patent Applications(s), dated Mar. 17, 2011.

\* cited by examiner

400

| That man | | in here | | is a | | serial | | killer. | |
|---|---|---|---|---|---|---|---|---|---|
| that man | 45% | engineer | 35% | is a | 34% | cereal | 32% | filler | 52% |
| batman | 21% | engine ear | 23% | was a | 31% | serial | 31% | killer | 15% |
| hat man | 13% | in here | 12% | was uh | 26% | see real | 20% | biller | 14% |
| | | in ear | 11% | | | surreal | 12% | fuller | 10% |

FIG. 5

| Harry | | Jim | | Berger | |
|---|---|---|---|---|---|
| n-best result | confidence | n-best result | confidence | n-best result | confidence |
| hairy | 70% | gym | 70% | burgher | 70% |
| airey | 60% | gin | 60% | burger | 65% |
| wary | 50% | jim | 50% | berger | 60% |
| harry | 40% | whim | 40% | | |
| arie | 30% | zim | 30% | | |
| werry | 20% | him | 20% | | |
| wherry | 10% | hymn | 10% | | |
| hurry | 5% | im | 5% | | |
| | 2% | | | | |

*FIG. 9A*

| seven | | zero | | four | | five | | one | | two | |
|---|---|---|---|---|---|---|---|---|---|---|---|
| n-best result | confid. | n-best result | confid. | n-best result | confid. | n-best result | confid. | n-best result | confid. | n-best result | confid. |
| seven | 70% | ero | 70% | for | 70% | five | 70% | won | 70% | to | 70% |
| heaven | 60% | hero | 60% | floor | 60% | hive | 60% | one | 60% | too | 60% |
| levan | 50% | zero | 50% | four | 50% | live | 50% | none | 50% | two | 50% |
| leaven | 40% | hiro | 40% | flor | 40% | vive | 40% | sun | 40% | few | 40% |
| | | | | fore | 30% | i've | | son | 30% | coup | 30% |
| | | | | flore | 20% | | | nun | 20% | you | 20% |
| | | | | faure | 10% | | | hun | 10% | yew | 10% |
| | | | | | | | | ton | 5% | queue | 5% |
| | | | | | | | | fun | 2% | | |

*FIG. 9B*

```
POST /Yap/Login HTTP/1.1
Host: www.icynine.com:8080
User-Agent:   Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

*FIG. 12*

Login/Login HEADER

| Request Headers | Request Body | Response Body |
|---|---|---|
| User-Agent | N/A | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 13*

Yap/Login HEADER

| Request Headers | Request Body | Response Body |
|---|---|---|
| User-Agent | N/A | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 14*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (opt) | | |
| Yap-Return-Cells | | |
| Yap-Return-TTS | | |
| Yap-Content-Type | | |
| Yap-Content-Length | | |

Binary Data Field

FIG. 15

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

*FIG. 16*

Returns: an XML Hierarchy containing

- result—the body of result xml
- result-type
- result-code
- result-code-description
- result-text
- result-is-silence
- result-details
- result-conf
- lattice

*FIG. 17*

TTS HEADER

| Request Headers | Request Body | Response Body |
|---|---|---|
| User-Agent | N/A | TTS Binary Audio Data |
| Content-Language | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 18*

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 19*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 20

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 21

USE OF METADATA TO POST PROCESS SPEECH RECOGNITION OUTPUT

I. CROSS-REFERENCE TO RELATED APPLICATIONS

The present application is a nonprovisional patent application of, and claims priority under 35 U.S.C. §119(e) to U.S. provisional patent application Ser. No. 61/041,220, filed Mar. 31, 2008 and titled "USE OF METADATA TO POST PROCESS SPEECH RECOGNITION OUTPUT," and is hereby incorporated herein by reference in its entirety.

Additionally, U.S. nonprovisional patent application Ser. No. 11/697,074, filed Apr. 5, 2007 and published as U.S. Patent Application Publication No. US 2007/0239837, is incorporated herein by reference, and each of the following patent applications, and any corresponding patent application publications thereof, are incorporated herein by reference:

(1) U.S. nonprovisional patent application Ser. No. 12/197,213, filed Aug. 22, 2008 and titled "CONTINUOUS SPEECH TRANSCRIPTION PERFORMANCE INDICATION;"
(2) U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES;"
(3) U.S. provisional patent application 61/091,330, filed Aug. 22, 2008 and titled "METHODS, APPARATUSES, AND SYSTEMS FOR PROVIDING TIMELY USER CUES PERTAINING TO SPEECH RECOGNITION;"
(4) U.S. nonprovisional patent application Ser. No. 12/198,112, filed Aug. 25, 2008 and titled "FILTERING TRANSCRIPTIONS OF UTTERANCES;"
(5) U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF;"
(6) U.S. nonprovisional patent application Ser. No. 12/212,644, filed Sep. 17, 2008 and titled "METHODS AND SYSTEMS FOR DYNAMICALLY UPDATING WEB SERVICE PROFILE INFORMATION BY PARSING TRANSCRIBED MESSAGE STRINGS;"
(7) U.S. nonprovisional patent application Ser. No. 12/212,645, filed Sep. 17, 2008 and titled "FACILITATING PRESENTATION OF ADS RELATING TO WORDS OF A MESSAGE;" and
(8) U.S. nonprovisional patent application Ser. No. 12/344,313, filed Dec. 26, 2008 and titled "VALIDATION OF MOBILE ADVERTISING FROM DERIVED INFORMATION."
(9) U.S. nonprovisional patent application Ser. No. 12/355,319, filed Jan. 16, 2009 and titled "USING A PHYSICAL PHENOMENON DETECTOR TO CONTROL OPERATION OF A SPEECH RECOGNITION ENGINE."
(10) U.S. nonprovisional patent application Ser. No. 12/400,723, filed Mar. 9, 2009 and titled "USE OF INTERMEDIATE SPEECH TRANSCRIPTION RESULTS IN EDITING FINAL SPEECH TRANSCRIPTION RESULTS."

Finally, the disclosure of provisional applications 60/789,837 and 61/091,330 are contained in Appendix A and Appendix B, respectively, attached hereto and, likewise, are incorporated herein in their entirety by reference and are intended to provide background and technical information with regard to the systems and environments of the inventions of the current provisional patent application. Similarly, the disclosure of the brochure of Appendix C is incorporated herein in its entirety by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. COMPUTER PROGRAM LISTING

Submitted concurrently herewith via the USPTO's electronic filing system, and incorporated herein by reference, is a computer program listing illustrating instructions, routines, and/or other contents of a computer program. The computer program listing is for 2 computer file(s) that represent a portion of an embodiment of the invention. The first file is titled "CallerNameCode.txt", has a file size of 4,509 bytes, a size on disk of 8,192 bytes and was created on Mar. 31, 2008 at 7:46:34 and last modified at the same time. The second file is titled "CallerNumberCode.txt", has a file size of 3,306 bytes, a size on disk of 4,096 bytes and was created on Mar. 31, 2008 at 7:46:22 and last modified at the same time. The computer program listing includes source code written in Java. The target hardware for this implementation is any hardware profile that can support a Java platform, or an equivalent platform.

IV. BACKGROUND OF THE PRESENT INVENTION

Automatic Speech Recognition ("ASR") systems convert spoken audio into text. Recognition accuracy for a particular utterance can vary based on many factors including the audio fidelity of the recorded speech, correctness of the speaker's pronunciation, and the like. These factors contribute to continuously varying levels of recognition accuracy which can result in several possible transcriptions for a particular utterance.

Proper nouns are one of the greatest challenges in the field of speech recognition. The sheer number of different names, places, brand names, etc. within one language/culture/country creates a monumental task for speech recognition engines to correctly convert these spoken proper nouns to text. This is compounded when you consider that when users interact with speech recognition engines in their native tough, they can also speak foreign names, places and brands that the speech engines must try to transcribe. An additional level of complexity arises when you also consider the fact that new proper nouns are also constantly being created as humans create new names, new brands are invented, new places to live are developed, etc.

One theoretical solution that could remedy this situation, thereby enabling ASR engines to convert spoken proper nouns to their textual representation with near perfect accuracy is to create acoustic models and language models which contain all possible proper nouns known to man. Language models ("LMs"), which may include hierarchical language models ("HLMs"), statistical language models ("SLMs"), grammars, and the like, assign probabilities to a sequence of words by means of a probability distribution and try to capture the properties of a language so as to predict the next word in a speech sequence. They are used in conjunction with acoustic models ("AMs") to convert dictated words to transcribed text. The current state of the art with regard to both creating and updating AMs and LMs requires speech scientists to manually process hundreds to thousands of hours of spoken phrases or words to build AM and LM databases containing phonemes, all of the possible words within a spoken language, and their statistical interrelationships. ASR engines then compare an audio fingerprint against the AMs and LMs with the goal of obtaining a statistically significant match of the spoken audio to its textual representation. There is great expense in this process since a great deal of engineering time is required to generate and update AMs and LMs as languages continue to evolve and new words are continually coined and used in common lexicon. Thus, the work involved in creating AMs and LMs for all proper nouns, not to mention that of constantly updating them, would be a colossal task, and by today's standards the cost of doing so would far exceed the return on investment.

Thus, a need exists for simpler techniques for transcribing proper nouns, forming part of an utterance, in an ASR system. Furthermore, once developed, at least some of these techniques may likewise be utilized to more accurately transcribe other portions of utterances.

V. SUMMARY OF THE PRESENT INVENTION

The following invention describes a solution to the challenges faced in the speech recognition space in terms of recognizing proper nouns when users interact with speech recognition engines. The same invention can be used to more easily convert spoken phone numbers into correctly formatted phone numbers with Arabic numerals after speech engines try to convert this type of audio data. The basic premise of the invention is that it compares personally identifiable data such as a user's electronic address book and/or Caller/Recipient ID information (in the case of processing voice mail to text) to the n-best results generated by the speech recognition engine for each word that is output by the engine. A goal of this comparison is to correct a possible misrecognition of a spoken proper noun such as a name or company with its proper textual form or a spoken phone number to correctly formatted phone number with Arabic numerals to improve the overall accuracy of the output of the voice recognition system.

A first aspect of the present invention relates to a method of utilizing metadata stored in a computer-readable medium to assist in the conversion of an audio stream to a text stream. This method includes the steps of converting an audio stream to a text stream using an ASR engine and comparing at least one portion of the text stream obtained from the ASR engine with metadata stored in a computer-readable medium.

In a feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A second aspect of the present invention relates to a method of converting an audio stream into a text stream, utilizing metadata. In one embodiment, the method includes the steps of initializing a client device so that the client device is capable of communicating with a backend server, recording an audio stream on the client device, transmitting a data stream, comprising the audio stream and metadata, from the client device to a backend server through a client-server communication protocol, converting the transmitted audio stream into a text stream on the backend server, comparing at least one portion of the text string with at least one portion of the metadata, replacing at least one portion of the text stream with at least one portion of the metadata and sending the text stream back to the client device.

In a feature of this aspect of the invention, the method includes the additional step of forwarding the text stream to one or more recipients. In another feature of this aspect of the invention, the method includes the additional step of displaying the text stream on the client device. In another feature of this aspect of the invention, the method includes the additional step of displaying advertising messages and/or icons on the client device according to keywords contained in the text stream, wherein the keywords are associated with the advertising messages and/or icons.

In another feature of this aspect of the invention, the method includes the additional step of locating the position of the client device through a global positioning system (GPS). In another feature of this aspect of the invention, the method includes the additional step of listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter. In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A second aspect of the present invention relates to a method of converting an audio stream into a text stream, utilizing metadata. This method includes the steps of initializing a client device so that the client device is capable of communicating with a backend server, speaking into a microphone of the client device to create an audio stream, simultaneously transmitting the audio stream from the client device to a backend server through a client-server communication protocol, transmitting metadata from the client device to the backend server through the client-server communication protocol, converting the transmitted audio stream into a text stream on the backend server, comparing at least one portion of the text string with at least one portion of the metadata, replacing at least one portion of the text stream with at least one portion of the metadata and sending the text stream back to the client device.

In a feature of this aspect of the invention, the method includes the additional step of forwarding the text stream to one or more recipients. In another feature of this aspect of the invention, the method includes the additional step of displaying the text stream on the client device. In another feature of this aspect of the invention, the method includes the additional step of displaying advertising messages and/or icons on the client device according to keywords contained in the text stream, wherein the keywords are associated with the advertising messages and/or icons.

In another feature of this aspect of the invention, the method includes the additional step of locating the position of the client device through a global positioning system (GPS). In another feature of this aspect of the invention, the method includes the additional step of listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter. In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A third aspect of the present invention relates to a method of converting an audio stream into a text stream, utilizing metadata. This method includes the steps of initializing a client device so that the client device is capable of communicating with a backend server, recording an audio stream on the client device, transmitting a data stream, comprising the audio stream from the client device to a backend server through a client-server communication protocol, converting the transmitted audio stream into a text stream on the backend server, sending the text stream back to the client device, comparing, on the client device, at least one portion of the text string with metadata stored on the client device and replacing at least one portion of the text stream with at least one portion of the metadata.

In a feature of this aspect of the invention, the method includes the additional step of forwarding the text stream to one or more recipients. In another feature of this aspect of the invention, the method includes the additional step of displaying the text stream on the client device. In another feature of this aspect of the invention, the method includes the additional step of displaying advertising messages and/or icons on the client device according to keywords contained in the text stream, wherein the keywords are associated with the advertising messages and/or icons.

In another feature of this aspect of the invention, the method includes the additional step of locating the position of the client device through a global positioning system (GPS). In another feature of this aspect of the invention, the method includes the additional step of listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter. In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message.

In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A fourth aspect of the present invention relates to a method of converting an audio stream into a text stream, utilizing metadata. This method includes the steps of recording an audio stream on a client device, converting the audio stream into a text stream, comparing at least one portion of the text string with metadata stored on the client device and replacing at least one portion of the text stream with at least one portion of the metadata.

In a feature of this aspect of the invention, the method includes the additional step of forwarding the text stream to one or more recipients. In another feature of this aspect of the invention, the method includes the additional step of displaying the text stream on the client device. In another feature of this aspect of the invention, the method includes the additional step of displaying advertising messages and/or icons on the client device according to keywords contained in the text stream, wherein the keywords are associated with the advertising messages and/or icons.

In another feature of this aspect of the invention, the method includes the additional step of locating the position of the client device through a global positioning system (GPS). In another feature of this aspect of the invention, the method includes the additional step of listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter. In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A fourth aspect of the present invention relates to a method of converting an audio stream into a text stream, utilizing metadata. This method includes the steps of transmitting a data stream, comprising an audio stream and metadata, from a client device to a backend server through a client-server communication protocol, converting the transmitted audio stream into a text stream on the backend server, comparing at least one portion of the text string with at least one portion of the metadata, replacing at least one portion of the text stream with at least one portion of the metadata and sending the text stream back to the client device.

In a feature of this aspect of the invention, the method includes the additional steps, to be performed before transmitting the data stream, of initializing the client device so that the client device is capable of communicating with the backend server and recording the audio stream on the client device.

In a feature of this aspect of the invention, the method includes the additional step of forwarding the text stream to one or more recipients. In another feature of this aspect of the invention, the method includes the additional step of displaying the text stream on the client device. In another feature of this aspect of the invention, the method includes the additional step of displaying advertising messages and/or icons on the client device according to keywords contained in the text stream, wherein the keywords are associated with the advertising messages and/or icons.

In another feature of this aspect of the invention, the method includes the additional step of locating the position of the client device through a global positioning system (GPS). In another feature of this aspect of the invention, the method includes the additional step of listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter.

In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A seventh aspect of this invention relates to software stored in a computer-readable medium for causing a client device and/or a backend server to perform functions. These functions include initializing a client device so that the client device is capable of communicating with a backend server, recording an audio stream on the client device, transmitting a data stream, comprising the audio stream and metadata, from the client device to a backend server through a client-server communication protocol, converting the transmitted audio stream into a text stream on the backend server, comparing at least one portion of the text string with at least one portion of the metadata, replacing at least one portion of the text stream with at least one portion of the metadata and sending the text stream back to the client device.

In a feature of this aspect of the invention, the software includes functions for forwarding the text stream to one or more recipients. In another feature of this aspect of the invention, the software includes a function for displaying the text stream on the client device. In another feature of this aspect of the invention, the software includes a function for displaying advertising messages and/or icons on the client device according to keywords contained in the text stream, wherein the keywords are associated with the advertising messages and/or icons.

In another feature of this aspect of the invention, the software includes a function for locating the position of the client device through a global positioning system (GPS).

In another feature of this aspect of the invention, the software includes a function for listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UT) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter.

In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

An eighth aspect of this invention relates to a system for converting an audio stream into a text stream, utilizing metadata. This system includes a client device, a backend server and software in the client device and backend server for causing the client device and/or backend server to perform functions. These functions include initializing a client device so that the client device is capable of communicating with a backend server, recording an audio stream on the client device, transmitting a data stream, comprising the audio stream and metadata, from the client device to a backend server through a client-server communication protocol, converting the transmitted audio stream into a text stream on the backend server, comparing at least one portion of the text string with at least one portion of the metadata, replacing at least one portion of the text stream with at least one portion of the metadata and sending the text stream back to the client device.

In a feature of this aspect of the invention, the software includes functions for forwarding the text stream to one or more recipients. In another feature of this aspect of the invention, the software includes a function for displaying the text stream on the client device. In another feature of this aspect of the invention, the software includes a function for displaying advertising messages and/or icons on the client device according to keywords contained in the text stream, wherein the keywords are associated with the advertising messages and/or icons.

In another feature of this aspect of the invention, the software includes a function for locating the position of the client device through a global positioning system (GPS).

In another feature of this aspect of the invention, the software includes a function for listing locations, proximate to the position of the client device, of a target of interest presented in the converted text stream.

In another feature of this aspect of the invention, the client device includes a microphone, a speaker, and a display. In another feature of this aspect of the invention, the client device is a mobile phone. In another feature of this aspect of the invention, the backend server comprises a plurality of applications.

In another feature of this aspect of the invention, the client device comprises a keypad having a plurality of buttons, configured such that each button is associated with one of the plurality of applications. In another feature of this aspect of the invention, the client device comprises a user interface (UI) having a plurality of tabs configured so that each tab is associated with a plurality of user preferences.

In another feature of this aspect of the invention, the step of initializing the client device includes the steps of initializing a desired application from the client device; and logging into a client account in the backend server from the client device.

In another feature of this aspect of the invention, the backend server comprises an ad filter, SMS filter, obscenity filter, number filter, date filter, and currency filter.

In another feature of this aspect of the invention, the client-server communication protocol is HTTP and/or HTTPS. In another feature of this aspect of the invention, the client-server communication is through a communication service provider of the client device and/or the Internet. In another feature of this aspect of the invention, the client-server communication protocol is UDP. In another feature of this aspect of the invention, the client-server communication is through a communications service provider of the client device and/or the Internet. In another feature of this aspect of the invention, the backend server comprises an ASR engine.

In another feature of this aspect of the invention, the ASR engine utilizes a speech recognition algorithm. In another feature of this aspect of the invention, the speech recognition algorithm comprises a grammar algorithm and/or a transcription algorithm. In another feature of this aspect of the invention, the backend server comprises a text-to-speech engine (TTS) for generating an audio message from a text message. In another feature of this aspect of the invention, the text stream comprises a highest-confidence string, and at least one alternative string. In another feature of this aspect of the invention, the audio stream is a smaller portion of a larger audio stream. In another feature of this aspect of the invention, the audio stream is a portion of a larger audio stream that has been broken up into utterances.

In another feature of this aspect of the invention, the metadata is stored on a mobile phone. In another feature of this aspect of the invention, the metadata is stored in an address book. In another feature of this aspect of the invention, the metadata is an alphanumeric string. In another feature of this aspect of the invention, the metadata is stored on a personal digital assistant. In another feature of this aspect of the invention, the metadata is stored in a contact list. In another feature of this aspect of the invention, the metadata is stored in a digital or electronic calendar. In another feature of this aspect of the invention, the metadata is stored on a desktop computer. In another feature of this aspect of the invention, the metadata is stored on a laptop computer.

In another feature of this aspect of the invention, the metadata is stored on a remote server. In another feature of this aspect of the invention, the metadata is a collation of data stored in different locations. In another feature of this aspect of the invention, the metadata is stored on a removable data-storage device. In another feature of this aspect of the invention, the metadata is stored on a tablet computer. In another feature of this aspect of the invention, the metadata is extracted from an incoming phone call. In another feature of this aspect of the invention, the metadata is Caller ID data. In another feature of this aspect of the invention, the metadata is Recipient ID data.

In another feature of this aspect of the invention, the metadata comprises Arabic numerals. In another feature of this aspect of the invention, the text stream comprises an SMS text message. In another feature of this aspect of the invention, the text stream is formatted in ASCII. In another feature of this aspect of the invention, the audio stream is a binary file. In another feature of this aspect of the invention, the audio stream is a .mp3 file. In another feature of this aspect of the invention, the audio stream is a .wav file. In another feature of this aspect of the invention, the data stream is compressed. In another feature of this aspect of the invention, the data stream is encrypted.

A further aspect of the present invention relates to a method of utilizing metadata stored in a computer-readable medium to assist in the conversion of spoken audio input, received by a hand-held mobile communication device, into a textual representation for display on the hand-held mobile communication device. This method includes the steps of initializing a hand-held mobile communication device so that the hand-held mobile communication device is capable of communicating with a backend server via a data channel of the hand-held mobile communication device, upon receipt of an utterance by the hand-held mobile communication device, recording and storing an audio message, representative of the utterance, in the hand-held mobile communication device in the form of binary audio data, transmitting, via the data channel, the recorded and stored binary audio data, representing the utterance, from the hand-held mobile communication device to a backend server through a client-server communication protocol, in conjunction with the transmission of the recorded and stored binary audio data, transmitting metadata from the hand-held mobile communication device to the backend server through the client-server communication protocol, converting the transmitted binary audio data into a textual representation of the utterance in the backend server, comparing at least one portion of the textual representation at least one portion of the metadata, replacing at least one portion of the textual representation with at least one portion of the metadata, and sending the converted textual representation of the utterance, with metadata replacement, from the server back to the hand-held mobile communication device.

In a feature of this aspect of the invention, the method includes the additional step of processing the converted textual representation of the utterance with a Digit Filter that substitutes Arabic numerals for words representing particular numbers or that are homophones of words representing particular numbers. In another feature, the step of processing the converted textual representation of the utterance with a Digit Filter occurs before the comparing and replacing steps. Alternatively, in another feature the step of processing the converted textual representation of the utterance with a Digit Filter occurs after the comparing and replacing steps.

In yet another feature of this aspect of the present invention the method further includes a step of processing the converted textual representation of the utterance with a Telephone Filter that formats the Arabic numerals of a telephone number into a conventional format. In a further feature, the step of processing the converted textual representation of the utterance with a Telephone Filter occurs before the comparing and replacing steps. Alternatively, in another feature, the step of processing the converted textual representation of the utterance with a Telephone Filter occurs after the comparing and replacing steps.

A feature of this aspect of the present inventions includes a step of forwarding the converted textual representation, with metadata replacement, from the hand-held mobile communication device to one or more recipients. Another feature of this aspect includes a step of displaying the converted textual representation, with metadata replacement, on the hand-held mobile communication device. In yet another feature the client device comprises a mobile phone. In another feature the client-server communication protocol is HTTP and/or HTTPS. In another feature the client-server communication protocol is UDP.

In another feature of this aspect of the present invention, the backend server includes an automatic speech recognition (ASR) engine. In a further feature, the ASR engine utilizes a speech recognition algorithm. In yet another feature the speech recognition algorithm comprises a grammar algorithm and/or a transcription algorithm. In another feature, the backend server includes a text-to-speech engine (TTS) for generating an audio message from a text message.

In a feature of this aspect of the invention, the text stream includes a highest-confidence string, and at least one alternative string. In another feature, the metadata is stored on a mobile phone. In yet another feature the metadata is stored in an address book. In a further feature, the metadata is in an alphanumeric string. In yet another feature the metadata is stored in a contact list. In another feature the metadata is stored in a digital or electronic calendar. In still another feature, the metadata is a collation of data stored in different locations. In yet still another feature the metadata is extracted from an incoming phone call. In another feature the metadata is Caller ID data. In still another feature, the metadata is Recipient ID data. In a further feature, the metadata comprises Arabic numerals. In another feature, the binary audio data is a binary file. In still another feature, the binary audio data is a .mp3 file. In another feature, the binary audio data is a .wav file.

In a feature of this aspect of the present invention, the binary audio data and the metadata form a single data stream. In another feature, the data stream is compressed. In yet another feature, the data stream is encrypted.

Another feature of this aspect of the present invention includes a step of displaying advertising messages and/or icons on the hand-held mobile communication device according to keywords contained in the textual representation of the utterance, wherein the keywords are associated with the advertising messages and/or icons. A further feature includes the additional step of locating a geospatial position of the hand-held mobile communication device through a global positioning system (GPS). Still another feature includes the additional step of listing locations, proximate to the position of the client device, of a target of interest presented in the converted text stream.

In another feature of this aspect of the invention, the backend server includes a plurality of applications. In another feature, the client device includes a keypad having a plurality of buttons, configured such that each button is associated with one of the plurality of applications. In an alternative feature the client device includes a user interface (UI) having a plurality of tabs configured so that each tab is associated with a plurality of user preferences. In yet another alternative feature, the step of initializing the client device includes the steps of initializing a desired application from the client device, and logging into a client account in the backend server from the client device. In yet another alternative feature, the backend server includes an ad filter, an SMS filter, an obscenity filter, a number filter, a data filter, and a currency filter.

Another aspect of the present invention relates to a method of utilizing metadata stored in a computer-readable medium to assist in the conversion of spoken audio input, received by a hand-held mobile communication device, into a textual representation for display on the hand-held mobile communication device. The method includes the steps of initializing a hand-held mobile communication device so that the hand-held mobile communication device is capable of communicating with a backend server via a data channel of the hand-held mobile communication device, upon receipt of an utterance by the hand-held mobile communication device, recording and storing an audio message, representative of the utterance, in the hand-held mobile communication device in the form of binary audio data, transmitting, via the data channel, the recorded and stored binary audio data, representing the utterance, from the hand-held mobile communication device to a backend server through a client-server communication protocol, storing metadata, associated with the hand-held mobile communication device, at the backend server, converting the transmitted binary audio data into a textual representation of the utterance in the backend server, comparing at least one portion of the textual representation at least one portion of the metadata, replacing at least one portion of the textual representation with at least one portion of the metadata, and sending the converted textual representation of the utterance, with metadata replacement, from the server back to the hand-held mobile communication device.

A feature of this aspect of the invention further includes a step of forwarding the converted textual representation, with metadata replacement, from the hand-held mobile communication device to one or more recipients.

Another aspect of the present invention relates to a system for utilizing metadata stored in a computer-readable medium to assist in the conversion of spoken audio input, received by a hand-held mobile communication device, into a textual representation for display on the hand-held mobile communication device. The system includes a hand-held mobile communication device, a backend server, and software in the hand-held mobile communication device and backend server for causing the hand-held mobile communication device and/or the backend server to perform functions. Such functions to be performed include initializing the hand-held mobile communication device so that the hand-held mobile communication device is capable of communicating with the backend server via a data channel of the hand-held mobile communication device, upon receipt of an utterance by the hand-held mobile communication device, recording and storing an audio message, representative of the utterance, in the hand-held mobile communication device in the form of binary audio data, and transmitting, via the data channel, the recorded and stored binary audio data, representing the utterance, from the hand-held mobile communication device to a backend server through a client-server communication protocol. Further functions include, in conjunction with the transmission of the recorded and stored binary audio data, transmitting metadata from the hand-held mobile communication device to the backend server through the client-server communication protocol, converting the transmitted binary audio data into a textual representation of the utterance in the backend server, comparing at least one portion of the textual representation at least one portion of the metadata, replacing at least one portion of the textual representation with at least one portion of the metadata, and sending the converted textual representation of the utterance, with metadata replacement, from the server back to the hand-held mobile communication device.

VI. BRIEF DESCRIPTION OF THE DRAWINGS

Further aspects, features, embodiments, and advantages of the present invention will become apparent from the following detailed description with reference to the drawings, wherein:

FIG. 5 is a table listing various possible transcription results for each fragment or portion of the utterance;

FIGS. 9A and 9B are tables listing various possible transcription results for each of several fragments or portions of the exemplary utterance;

FIG. 12 is a typical header section of an HTTP request from the client in the commercial implementation;

FIG. 13 illustrates exemplary protocol details for a request for a location of a login server and a subsequent response;

FIG. 14 illustrates exemplary protocol details for a login request and a subsequent response;

FIG. 15 illustrates exemplary protocol details for a submit request and a subsequent response;

FIG. 16 illustrates exemplary protocol details for a results request and a subsequent response;

FIG. 17 illustrates exemplary protocol details for an XML hierarchy returned in response to a results request;

FIG. 18 illustrates exemplary protocol details for a text to speech request and a subsequent response;

FIG. 19 illustrates exemplary protocol details for a correct request;

FIG. 20 illustrates exemplary protocol details for a ping request; and

FIG. 21 illustrates exemplary protocol details for a debug request.

VII. DETAILED DESCRIPTION OF THE PREFERRED EMBODIMENTS

Figure 1:
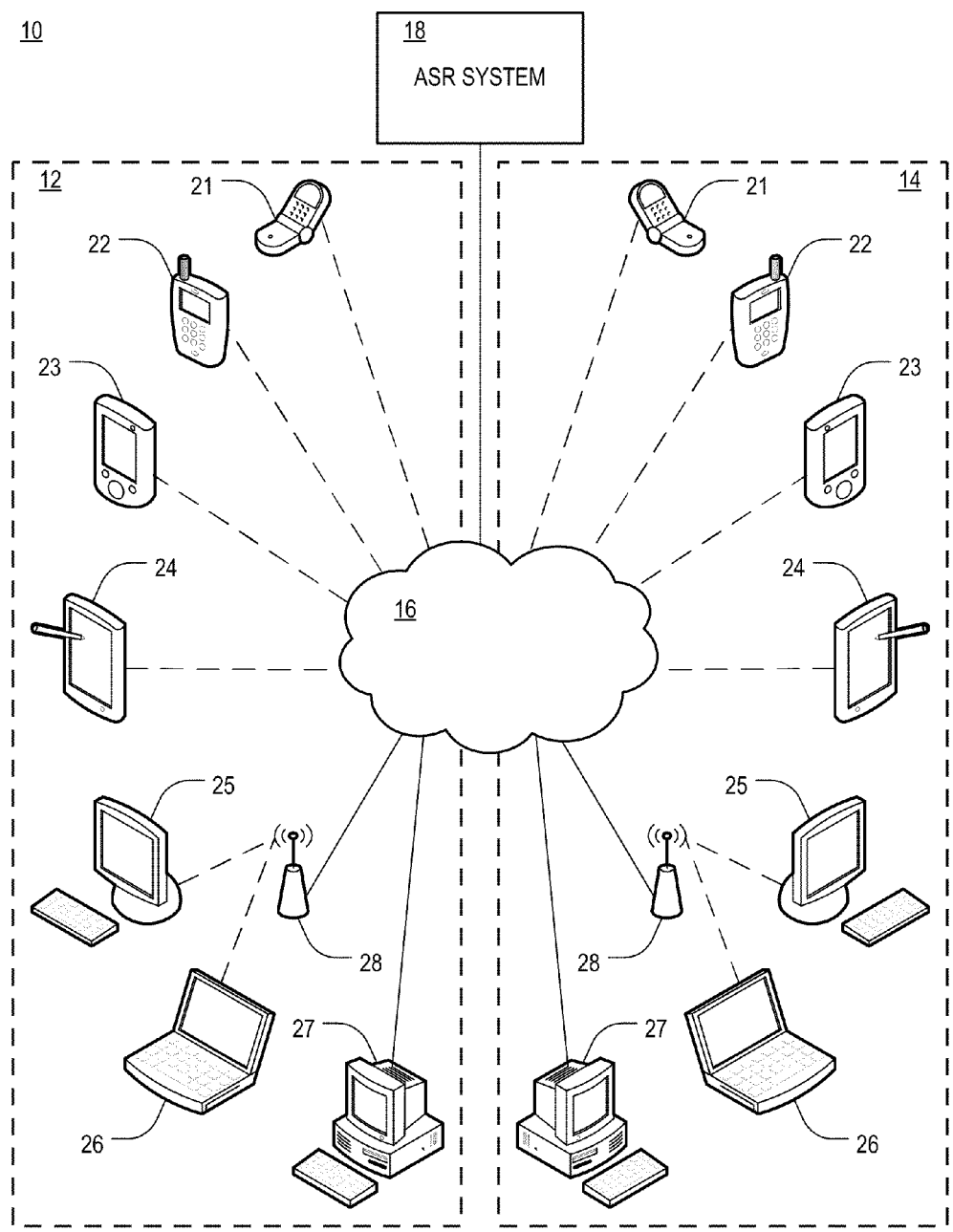
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is it to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers."Finally, when used herein to join a list of items, "and" denotes "all of the items of the list."Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an automatic speech recognition ("ASR") system 18, including an ASR engine. Transmitting and receiving devices 12,14 may include cell phones 21, smart phones 22, PDAs 23, tablet notebooks 24, various desktop and laptop computers 25,26,27, and the like, one or more of which may be a handheld device. At least some of the handheld devices are capable of communications using both voice and data channels, either separately or simultaneously, and in at least some embodiments, in parallel. One or more of the devices 12,14, such as the illustrated iMac and laptop computers 25,26, may connect to the network systems 16 via a wireless access point 28. The various devices 12,14 (one or both types of which being sometimes referred to herein as "client devices") may be of any conventional design and manufacture.

Figure 2:
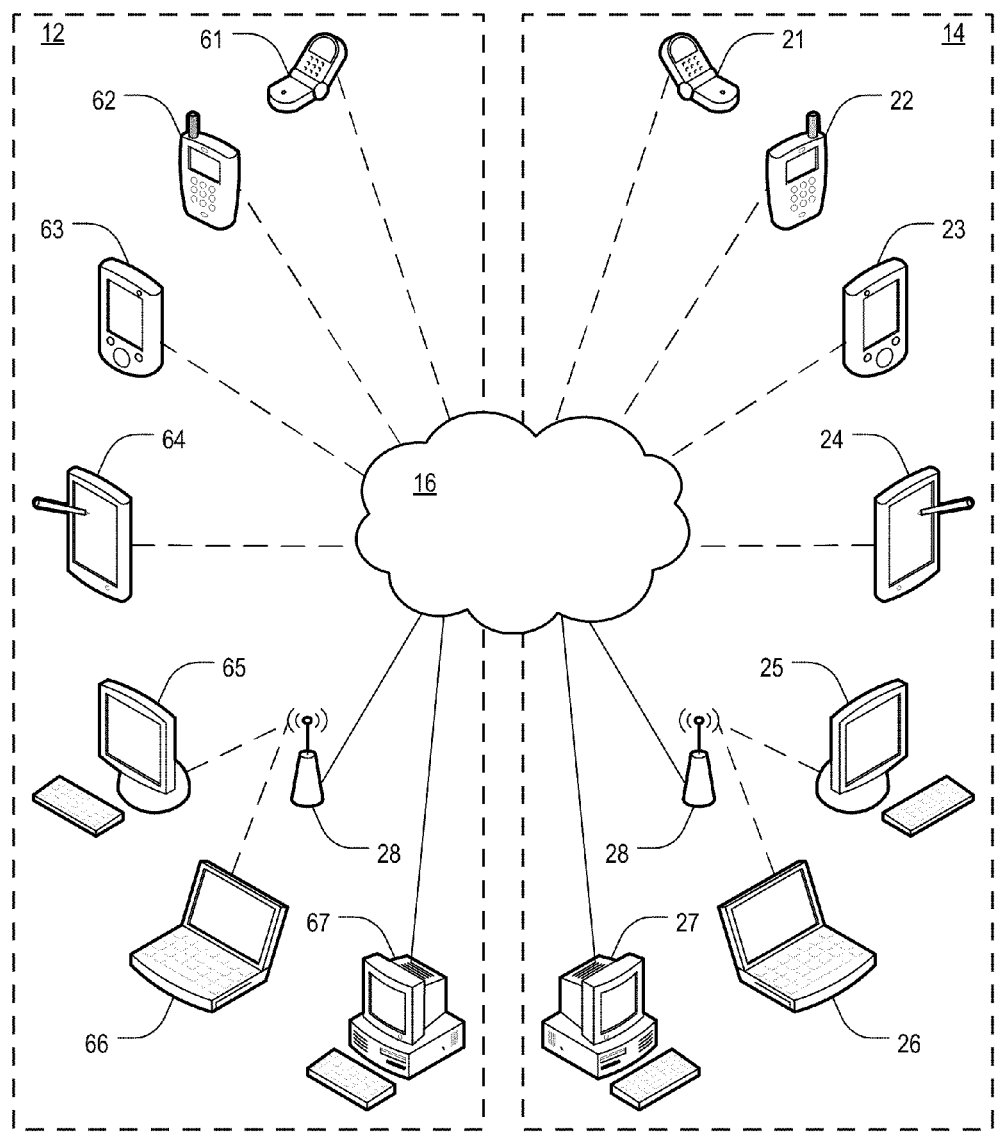
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably include, inter alia, a telecommunications network. In the context of instant messaging, the communications systems 10,60 each preferably include, inter alia, the Internet.

Figure 3:
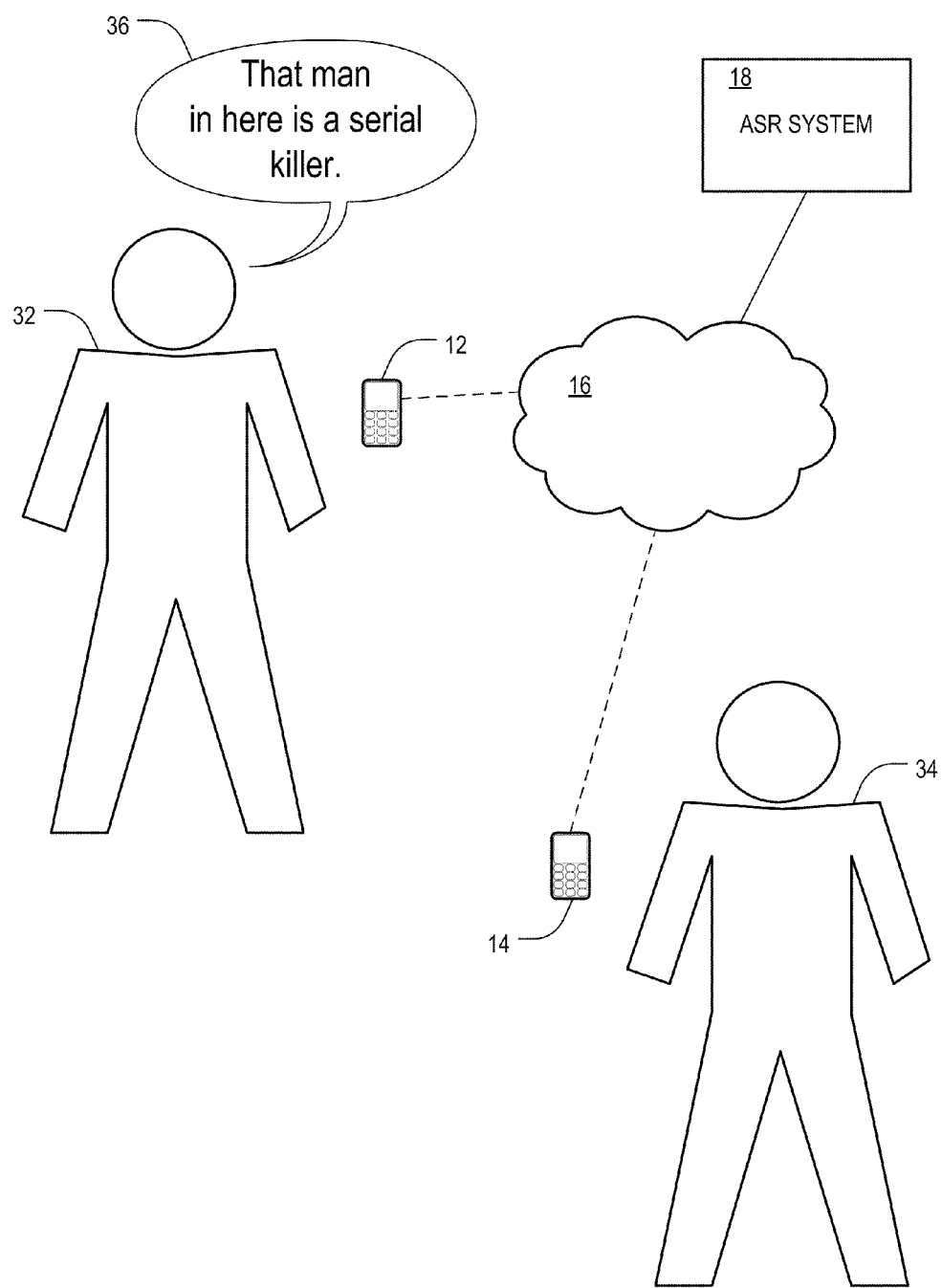
FIG. 3 is a block diagram illustrating communications between two users via a portion of the communication system of FIG. 1.

FIG. 3 is a block diagram illustrating communications between two users 32,34 via a portion of the communication system 10 of FIG. 1. As shown therein, a first user 32, sometimes referred to herein as a "transmitting user," is communicating with a second user 34, sometimes referred to herein as a "receiving user," by way of respective transmitting and receiving devices 12,14. More particularly, the transmitting user 32 uses his transmitting device 12 to initiate text messages that are transmitted to, and received by, the receiving user 34 via her receiving device 14. In the context of text messaging, the transmitting user 32 may send text messages using his transmitting device 12, for example via SMS, and the receiving user 34 receives text messages on his receiving device 14, in this case also via SMS. In the context of instant messaging, the transmitting user 32 may send instant messages via an IM client using his transmitting device 12, and particularly using a data channel of the transmitting device 12, and the receiving user 34 receives instant messages on her receiving device 14, via an IM client, particularly using a data channel of the receiving device 14. In either case, the transmitting user 32 preferably speaks into his transmitting device 12 with his utterances being converted to text for communicating to the receiving device 14, all as more fully described hereinbelow.

In either case, the first user 32 speaks an utterance 36 into the transmitting device 12, and the recorded speech audio is sent to the ASR system 18, preferably using a data channel of the device 12. In FIG. 3, the utterance 36 is "That man in here is a serial killer." The ASR engine in the ASR system 18 attempts to recognize and transcribe the speech into text.

In at least some embodiments, the transmitting user 32 in FIG. 3 may generate text messages by speaking into his transmitting device 12 and causing his utterances to be converted to text for communicating to the receiving device 14. One or more systems and methods for carrying out such a process are described, for example, in the aforementioned U.S. Patent Application Pub. No. US 2007/0239837, but are at least partially described herein. More particularly, FIG. 4 may be understood to be a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating under joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. Such communications (V1, T4, V/T1) to and from the mobile phone 12 are preferably carried out using a data channel, rather than a voice channel, of the mobile phone 12. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiments, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance 36, thus generating an audio message, V1. At this stage, the audio message V1 is recorded in the mobile phone 12. By releasing the button, the recorded audio message V1 is sent to the backend server 160 through the mobile communication service provider 140.

Figure 4:
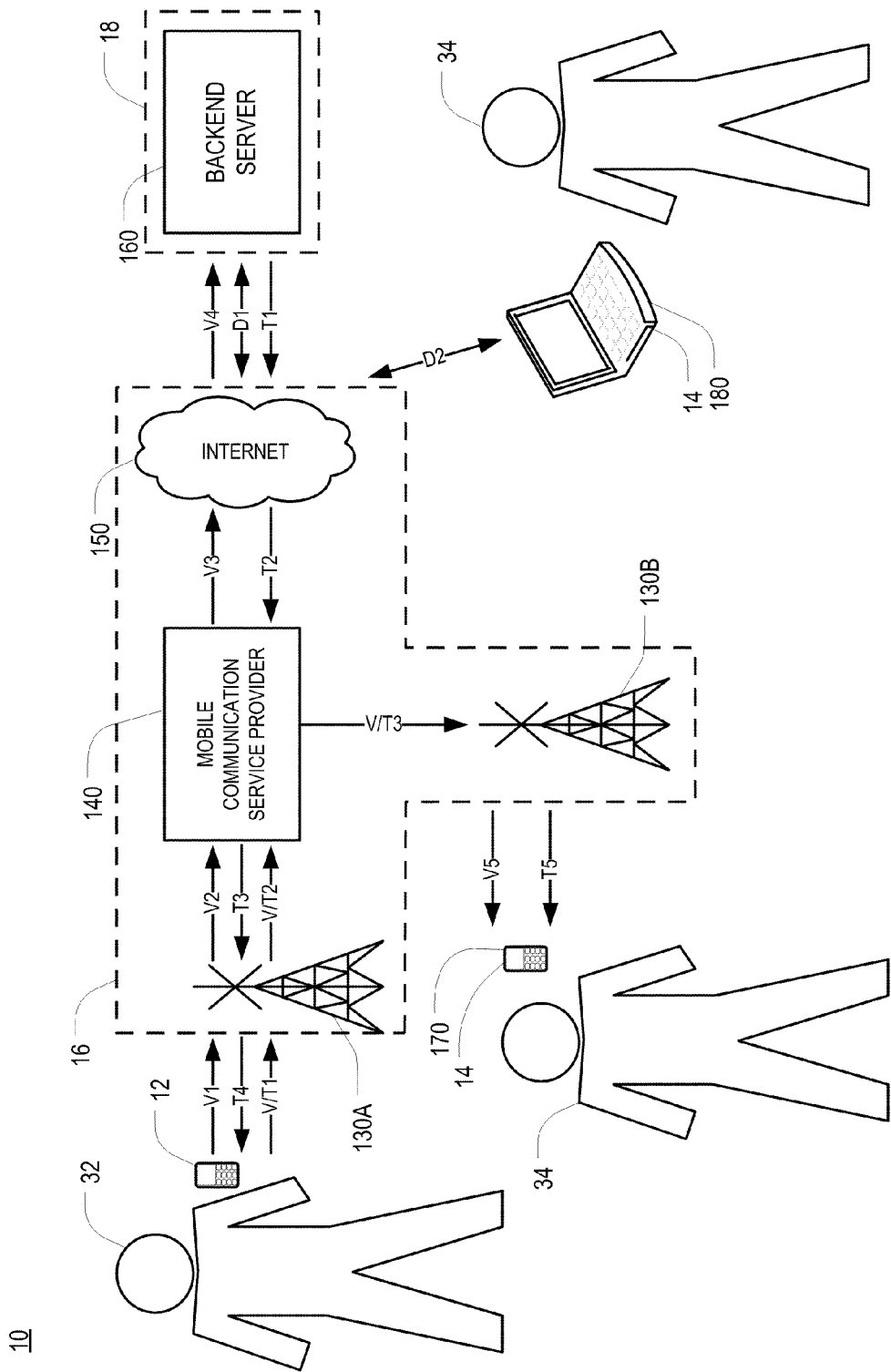
FIG. 4 is a block diagram of an exemplary implementation of the system of FIG. 1.

In the exemplary embodiment of the present invention as shown in FIG. 4, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T2 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system 10 may be utilized to convert an audio message into a text message. In at least one implementation, this may be accomplished by first initializing a transmitting device so that the transmitting device is capable of communicating with a backend server 160. Second, a user 32 speaks to or into the client device 12 so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Still further, in at least one implementation, one or both types of client device 12,14 may be located through a global positioning system (GPS); and listing locations, proximate to the position of the client device 12,14, of a target of interest may be presented in the converted text message.

Furthermore, in converting speech to text, speech transcription performance indications may be provided to the receiving user 34 in accordance with the disclosure of U.S. patent application Ser. No. 12/197,213, filed Aug. 22, 2008 and entitled "CONTINUOUS SPEECH TRANSCRIPTION PERFORMANCE INDICATION," which, together with any corresponding patent application publications thereof, is hereby incorporated herein by reference.

Additionally, in the context of SMS messaging, the ASR engine preferably makes use of both statistical language models (SLMs) for returning results from the audio data, and finite grammars used to post-process the text results, in accordance with the disclosure of U.S. patent application Ser. No. 12/198, 112, filed Aug. 25, 2008 and entitled "FILTERING TRANSCRIPTIONS OF UTTERANCES," which, together with any corresponding patent application publications thereof, is incorporated herein by reference. This is believed to result in text messages that are formatted in a way that looks more typical of how a human would have typed the text message using a mobile device.

The ASR system 18 transmits the text back to the originating device 12. Once this device 12 receives the transcribed text, it preferably displays the message to the transmitting user 32 for verification and editing as necessary, and upon approval by the user, the text may be formatted into a text message or instant message that may be transmitted to a destination communication device such as the receiving device 14 described previously. If not already selected or pre-set, the user 32 selects a desired phone number or other destination address stored in memory on the transmitting device 12 or in a remote server or inputs a number or other address via one or more input elements, and an outgoing message signal corresponding to the number or address is transmitted. Voice commands may be utilized to control such functionality, and such a process may be implemented, for example, in accordance with the disclosure of U.S. patent application Ser. No. 12/355,319, filed Jan. 16, 2009 and entitled "USING A PHYSICAL PHENOMENON DETECTOR TO CONTROL OPERATION OF A SPEECH RECOGNITION ENGINE," which, together with any corresponding patent application publications thereof, is incorporated herein by reference.

FIG. 5 is a table 400 listing various possible transcription results for each fragment or portion of the utterance 36. More particularly, "that man," "batman" and "hat man" are listed as possible transcription results for the utterance fragment "That man;" "engineer," "engine ear," "in here" and "ear" are presented as possible transcription results for the utterance fragment "in here;" "is a," "was a" and "was uh" are listed as possible transcription results for the utterance fragment "is a;" "cereal," "serial," "see real" and "surreal" are listed as a possible transcription results for the utterance fragment "serial;" and "filler," "killer," "biller" and "fuller" are listed as possible transcription results for the utterance fragment "killer." It will be appreciated that each fragment is presented in conjunction with a confidence level, expressed as a percentage, representing the calculated relative confidence the ASR system 18 has that that fragment is accurate. In FIG. 5, the possible transcription results for each fragment or portion of the utterance 36 are presented in descending order of confidence. It will be further appreciated that only those results in which the confidence level is 10% or above are shown in the table 400, but that many other possible results may be considered as well.

When transcription is complete, the fragment results having the highest confidence levels are presented to the user 32 in the order in which the utterance fragments were spoken. In particular, for each fragment of the utterance, the fragment result having the highest confidence level is preferably presented to the user 32 such that the overall transcribed utterance represents the most likely transcription result as measured by the confidence levels of the respective fragment results.

Figure 6A:
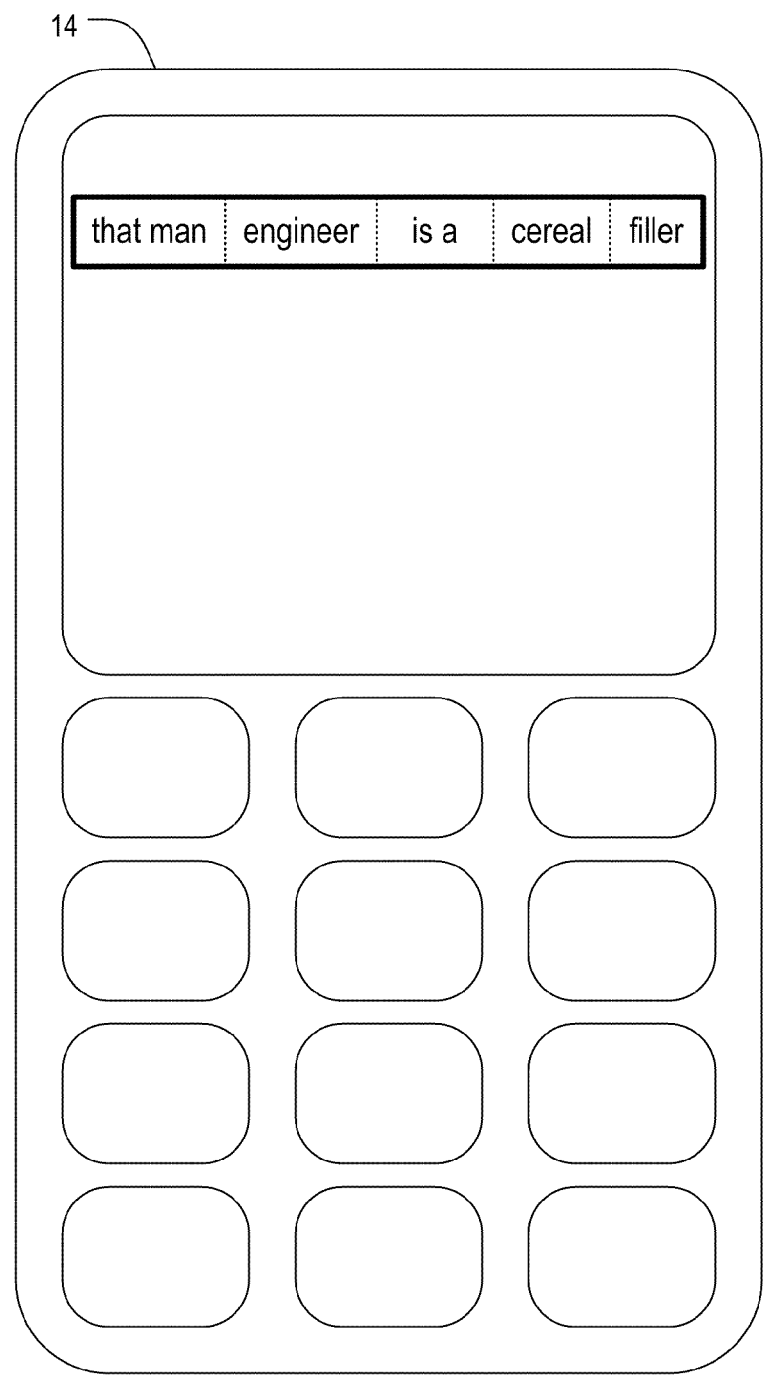
FIGS. 6A-6E are graphical depictions, on a transmitting device, of the transcription of the utterance of FIG. 3, illustrating the selection and replacement of one of the fragment results reached by the ASR engine for one portion of the utterance.

If the transcribed utterance thus presented is not the one desired by the user 32, the user 32 may then take action to edit or correct the result. For example, the user 32 may choose to edit one or more of the fragment results. FIGS. 6A-6E are graphical depictions, on a transmitting device 12, of the transcription of the utterance 36 of FIG. 3, illustrating the selection and replacement of one of the fragment results reached by the ASR engine for one portion of the utterance 36. In FIGS. 6A-6E, all of the fragment results having a confidence level of 10% or more are available to the user 32 for selection and replacement of the corresponding portion of the transcribed utterance. In FIG. 6A, the complete transcribed utterance in which the ASR engine has the greatest confidence is first presented to the user 32. It will be appreciated that this proposed transcription is not accurate, in that the ASR engine has returned "engineer" as the most likely fragment result for "in here," "cereal" as the most likely fragment result for "serial," and "filler" as the most likely fragment result for "killer."

Figure 6B:
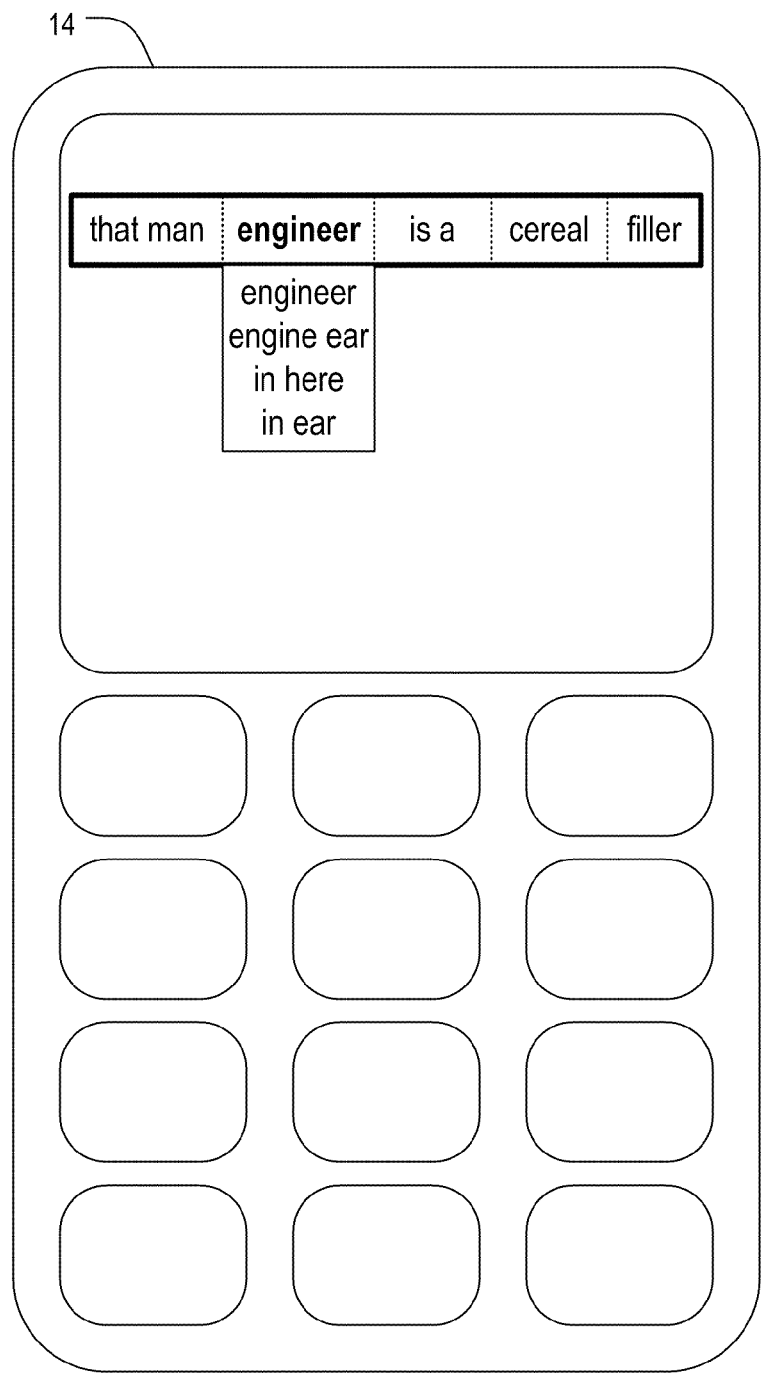
Figure 6C:
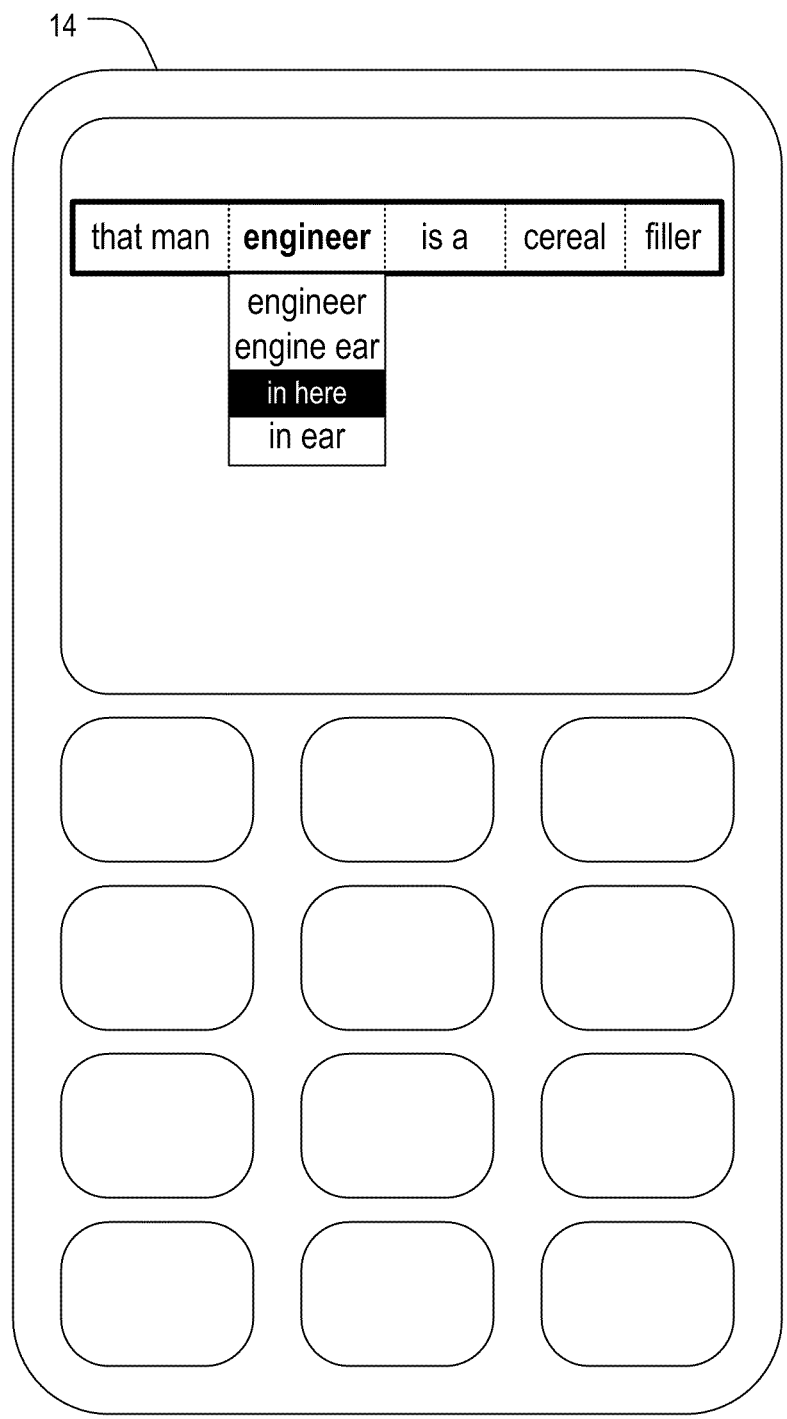
Figure 6D:
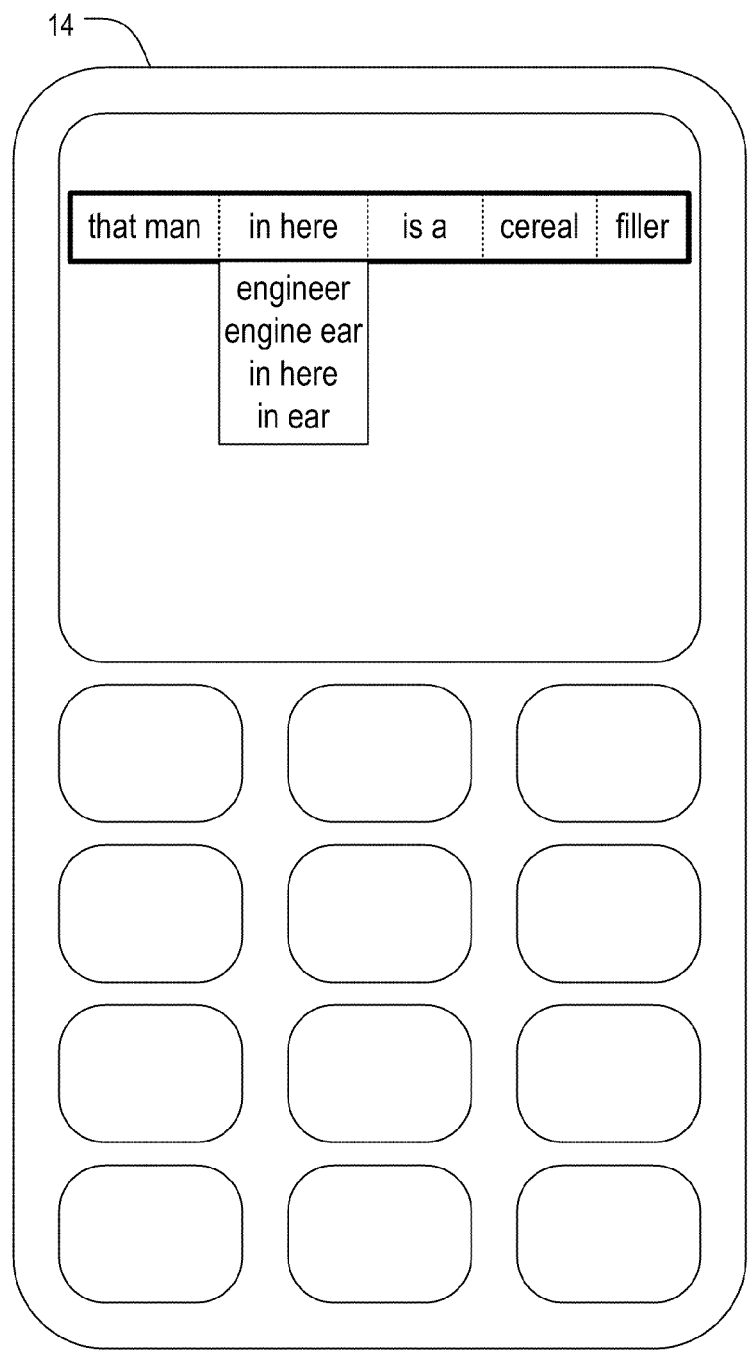
Figure 6E:
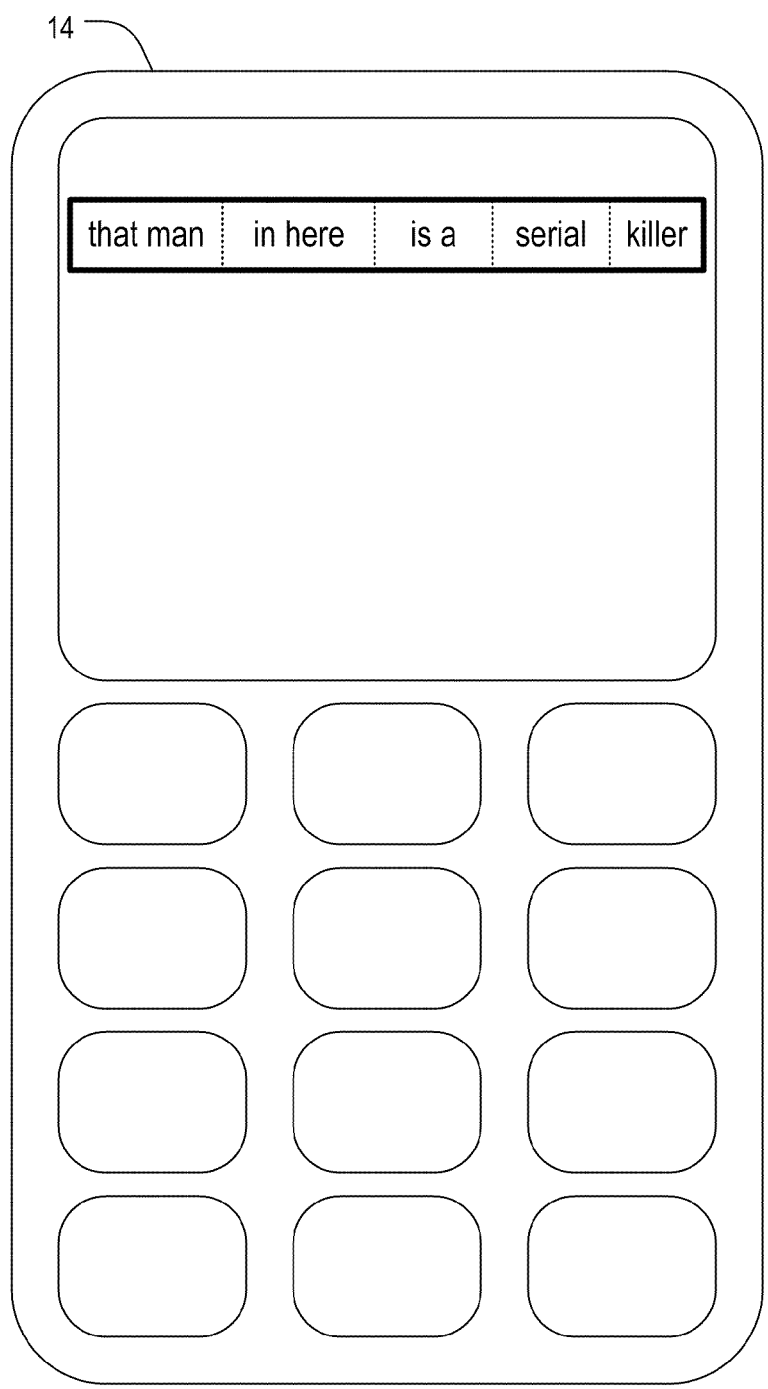

In FIG. 6B, the user 32 begins correcting the transcribed utterance by selecting one of the fragment results for editing or correction. In particular, the user 32 has selected the utterance fragment with the final result "engineer" for replacement, thereby causing a drop-down menu or list to appear. Referring again to FIG. 5, it is to be understood that the items in the drop-down list in FIG. 6B are preferably the fragment results for that portion of the utterance 36 that had confidence levels of 10% or more. In FIG. 6C, the user 32 has selected one of those alternative fragment results ("in here") to replace the one returned by the ASR engine. In FIG. 6D, the user 32 has gone ahead and replaced "engineer" with "in here," producing the edited final result of "that man in here is a cereal filler." By further using the same process to replace the final result "cereal" with "serial" and the final result "filler" with "killer," the user 32 is able to reach the intended result of "that man in here is a serial killer," as shown in FIG. 6E. Selection may be accomplished in any conventional manner, including manipulation of input keys, buttons or the like on the device 12, use of a stylus or other external tool, voice activation, or the like.

Figure 7:
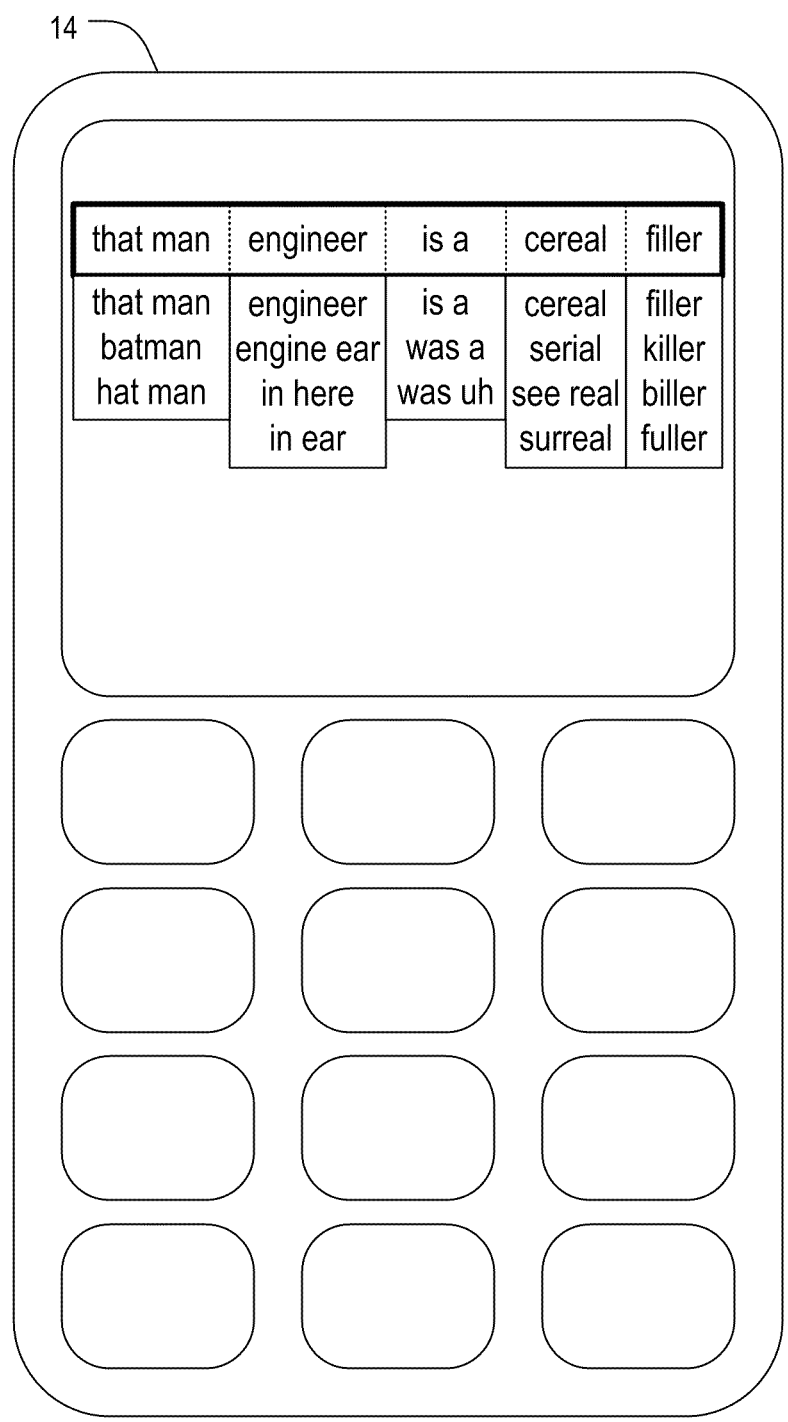
FIG. 7 is a graphical depiction, on a transmitting device, of the transcription of the utterance of FIG. 3, illustrating the various alternatives reached by the ASR engine for each portion of the utterance.

In another approach, the user 32 may be presented with all of the fragment results for all of the portions of the transcribed utterance at the same time. FIG. 7 is a graphical depiction, on a transmitting device 12, of the transcription of the utterance 36 of FIG. 3, illustrating the various alternatives reached by the ASR engine for each portion of the utterance 36. The final transcription result, representing the result in which the ASR engine has the highest confidence level, is presented at the top. Other fragment results returned by the ASR engine for each of the various portions of the utterance 36 are presented beneath the highest-confidence result. More particularly, "batman" and "hat man" are presented as alternative fragment results for the utterance fragment that became "that man;" "engine ear," "in here" and "ear" are presented as alternative fragment results for the utterance fragment that became "engineer;" "was a" and "was uh" are presented as alternative fragment results for the utterance fragment that became "is a;" "serial," "see real" and "surreal" are presented as alternative fragment results for the utterance fragment that became "cereal;" and "killer," "biller" and "fuller" are presented as alternative fragment results for the utterance fragment that became "filler."

In at least some embodiments, information about the order in which the ASR engine reached the results is provided in the form of animation or via other means, and such a process may be implemented, for example, in accordance with the disclosure of U.S. patent application Ser. No. 12/400,723, filed Mar. 9, 2009 and entitled "USE OF INTERMEDIATE SPEECH TRANSCRIPTION RESULTS IN EDITING FINAL SPEECH TRANSCRIPTION RESULTS," which, together with any corresponding patent application publications thereof, is incorporated herein by reference. For example, incremental results may be displayed in an animated, real-time visual display, which then updates frequently as new information becomes available. In this way, the user 32 is exposed to most or all of the options that the ASR engine considered during transcription and can more easily navigate to those options, after transcription is complete, in order to select a transcription option different from the one chosen by the engine as having the highest confidence value. Various techniques for displaying real time information about preliminary and intermediate transcription results are described in the aforementioned patent application.

Referring again to FIG. 7, it will be appreciated that each utterance fragment or portion, and its corresponding alternate transcriptions, may be a single word, or may be a phrase made up of multiple words. The drop-down lists, or any other graphical arrangement of alternate transcription fragments, can be displayed in an animated fashion after the entire transcription has been received. The lists of alternate transcription fragments can then be removed from the display leaving only the highest-confidence results visible.

In accordance with one or more preferred embodiments of the present invention, the process described thus far may be further enhanced by providing certain identifying data, available to the user, to the ASR engine in order to make the conversion of an utterance to text more accurate. This data may be referred to as "metadata." In the context of a voicemail, such metadata may include, for example, caller identification ("Caller ID") (transmitting user) data such as the caller's name and the phone number corresponding to the calling device 12 (i.e., the source of the voicemail), recipient identification ("Recipient ID") (receiving user) data such as the recipient's name and the phone number corresponding to the receiving device 14 (i.e., the recipient of the voicemail), address book data (data stored in the calling/transmitting or receiving device 12,14), and the like.

The metadata may be used to more accurately transcribe certain utterance fragments, including names, companies, telephone numbers and the like. This may be very useful, for example, in the context of voicemails, which frequently include names and telephone numbers of callers, and, perhaps to a lesser extent, of recipients as well. For example, a typical voicemail may be generated by the following utterance 36:

"Hello Harry, this is Jim Berger, just wanted to let you know we are on for Tuesday. Please call me back at 704-555-1212 when you get a chance."

However, a conventional ASR engine may transcribe such an utterance as follows:

"Hello hairy, this is gym burgher, just wanted to let you know we are on for Tuesday. Please call me back at seven ero for five five five hun to hun to when you get a chance."

As will be apparent, the conventional transcription of the utterance 36 includes inaccuracies pertaining to names and numbers included in the utterance 36.

Figure 8A:
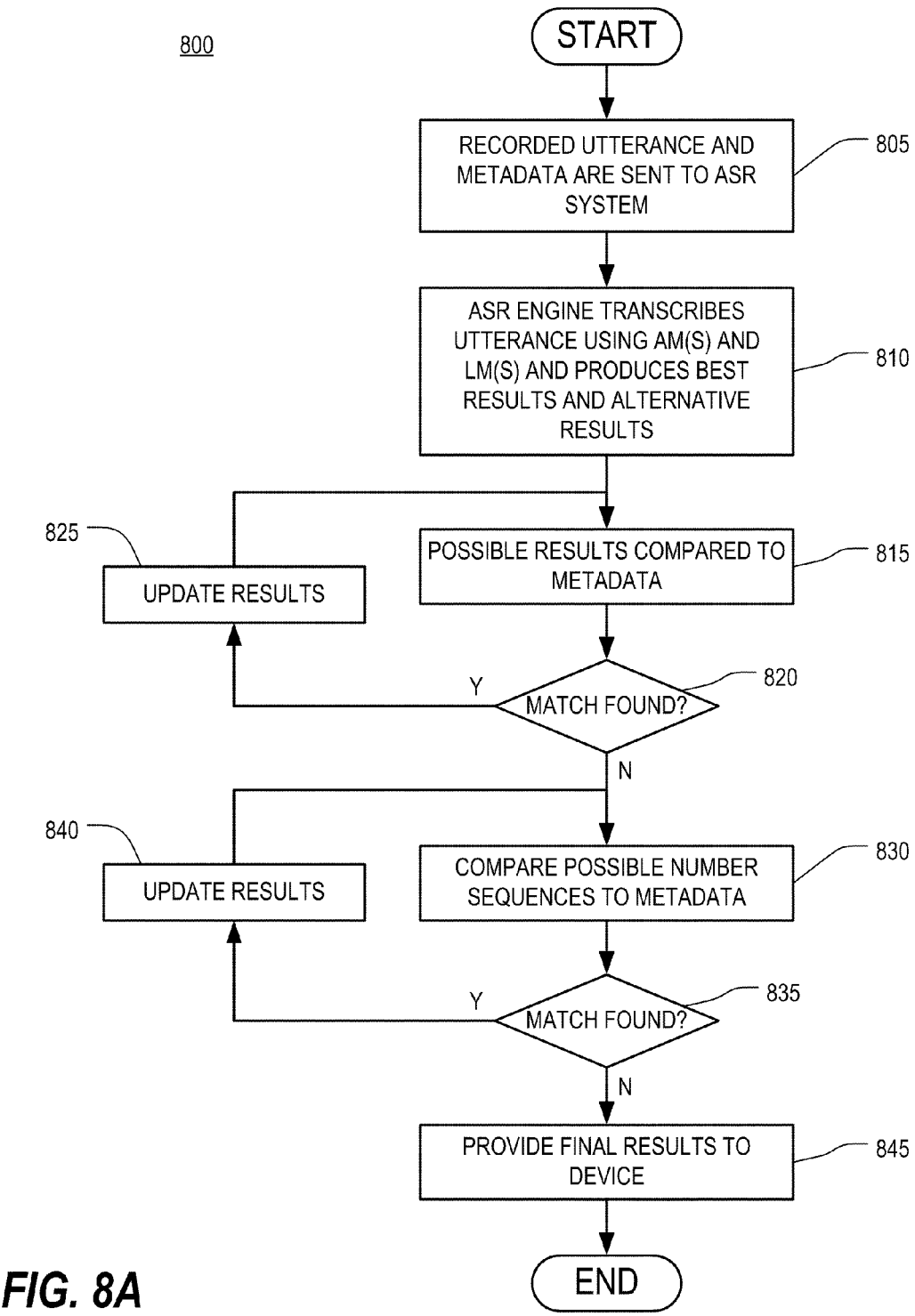
FIG. 8A is a high-level flowchart illustrating the operation of such a process.

FIG. 8A is a high-level flowchart illustrating the operation of a process 800 that utilizes metadata such as that described to produce a more accurate transcription of the utterance 36. As shown therein, at least a portion of the process 800 begins at step 805 when a recorded utterance 36 is sent, together with metadata, to the ASR system 18 for transcription. The utterance 36 may be recorded at a calling or transmitting device 12, the utterance 36 may be received at a receiving device 14 and then sent from the receiving device 14 to the ASR system 18 for transcription, or the utterance may be recorded at a calling device 12 and sent directly to the ASR system 18 for transcription and subsequent transmission as a text message from the calling device 12 to a receiving device 14. In either case, metadata from the receiving device 14 or calling device 12, respectively, is sent to the ASR system 18 along with the recorded utterance.

At step 810, the ASR engine transcribes the utterance 36 according to conventional transcription techniques. In particular, as part of the standard output produced by the ASR engine, an n-best list of all the utterance fragment possibilities and their corresponding statistical confidence score for each utterance fragment is created. FIG. 9A is a table listing various possible transcription results for each of several fragments or portions of the exemplary utterance 36 set forth above. Often, and particularly for proper nouns such as names and the like, the ASR engine may fail to select, as its final output, the proper result for every fragment of the utterance 36. In many cases, however, the proper result may be included as one of the other possible results considered by the ASR engine. It will be appreciated that the chances that the correct result for a particular utterance fragment is included in the list of possible results are increased when the value of n is increased. Thus, although considered by the ASR engine, these results are not included in the final output because the confidence levels for the results were not as high as those in the final output.

As described in one or more of the commonly-assigned patent applications referenced herein, the results thus created (i.e., results similar to those shown in the table of FIG. 9A) may, in at least some embodiments or applications, be returned to the user's device for manual editing or re-recording as desired. However, in at least some cases, the results may be improved through the use of the metadata supplied with the recorded utterance 36. More particularly, at step 815, each possible result for one or more fragment in the utterance 36 is compared to at least a portion of the metadata to determine if there is a statistically significant match. For metadata of the type described previously, the possible results may thus be compared to Caller ID data, Recipient ID data, address book data, and the like. It will be appreciated that the comparison may be done sequentially or in parallel. If at step 820 a statistically significant match is found, then at step 825, if the possible result for which the match is found is not already in the final output, such possible result is promoted to the final output.

In the exemplary utterance 36 set forth above, this comparison may take place as follows. First, the word "hello" and all its n-best list results are compared against the Caller ID/Recipient ID/address book data. Because the word "hello" is not the type of data found typically found in a Caller ID, Recipient ID or address book, it is unlikely that a statistically significant match will be found in the metadata and thus the result originally returned for this utterance fragment will likely remain unchanged. On the other hand, when the word "hairy" and all its n-best list results are compared against the Caller ID/Recipient ID/address book data, a match may be found, for example, with the Recipient ID (such as when the name of the user of the recipient device 14 is "Harry"), in which case the matched possible result in the n-best list is promoted to the top of the list. In other words, if the Recipient ID includes the name "Harry," then the originally-proposed output "hairy" is replaced with the word or name "Harry" from the Recipient ID. Continuing through the originally-proposed transcription that was produced at step 810, the words "this," "just," "wanted," and the like remain unchanged, but comparisons of the words "gym" and "burgher" may find matches in Caller ID data (such as when the name of the user of the calling device 12 is "Jim Berger"), and thus the originally-proposed outputs "gym" and "burgher" are replaced with the words or names "Jim" and "Berger," respectively, from the Caller ID data. Proper results for all proper nouns in the original output have now been provided using this method and the transcribed sentence would now read:

"Hello Harry, this is Jim Berger, just wanted to let you know we are on for Tuesday. Please call me back at seven ero for five five five hun to hun to when you get a chance."

Figure 8B:
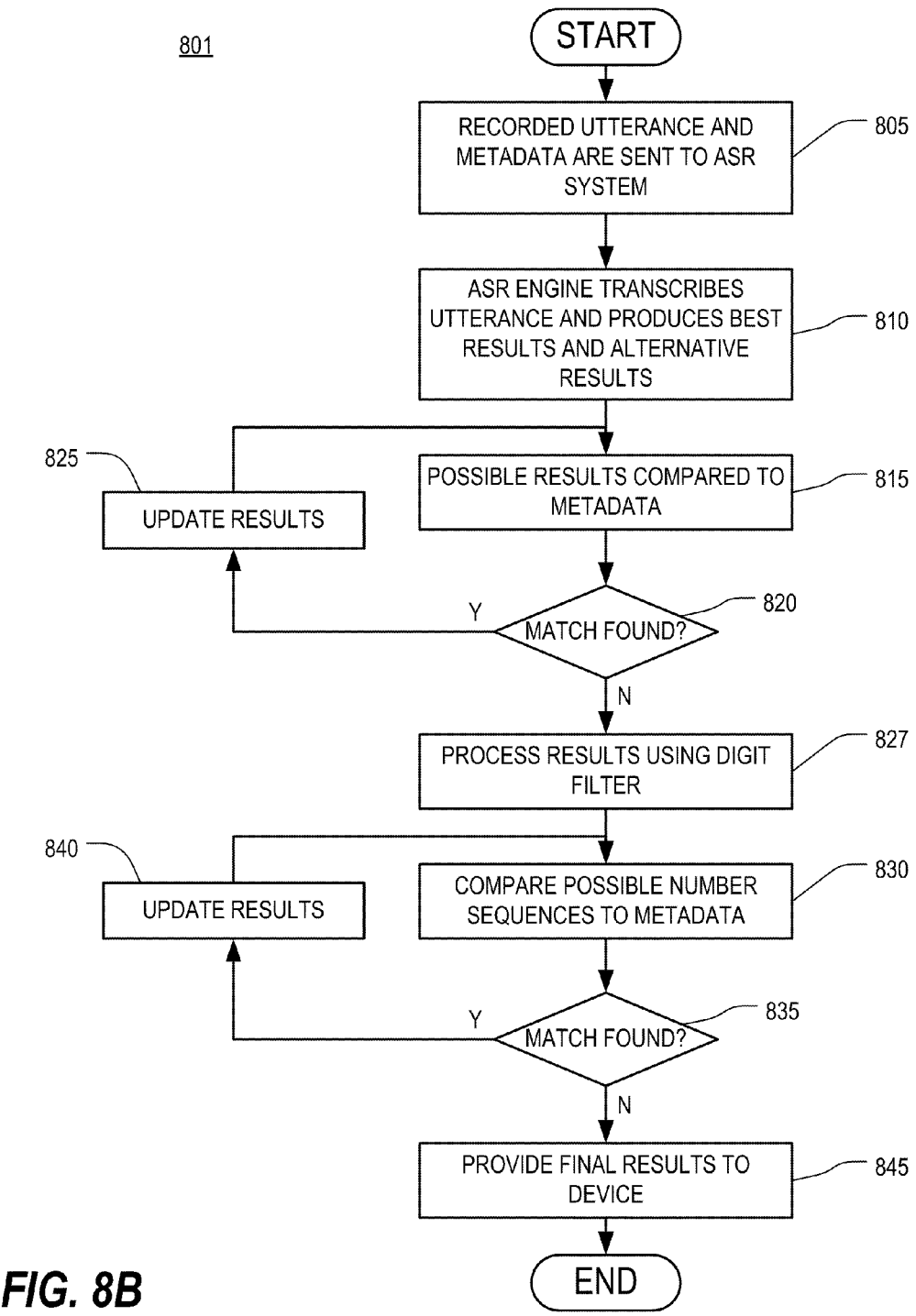
FIG. 8B is a high-level flowchart illustrating the operation of another such process.

Similar techniques may also be combined with other filtering and processing techniques to achieve still further-improved results. For example, as described in the aforementioned U.S. patent application Ser. No. 12/198,112, possible results in the n-best list that are words representing particular numbers, or words that are homophones of words representing particular numbers, may be processed by a "Digit Filter" that substitutes Arabic numerals for those words. The use of such a filter is illustrated in FIG. 8B at step 827. When each fragment in a sequence of utterance fragments may be replaced by an Arabic numeral, the corresponding sequence of Arabic numerals may be compared at step 830 to the metadata as described previously. If at step 835 a match is found, then at step 840 the entire sequence of utterance fragments is replaced with the sequence of Arabic numerals from the metadata.

For example, FIG. 9B is a table listing various possible transcription results for each of several fragments or portions of the exemplary utterance 36 set forth above. After producing these results, the ASR engine or post-transcription filter may determine that alternative possible results for the word sequence "seven ero for five five five hun to hun to" includes the Arabic numeral sequence "7 0 4 5 5 5 1 2 1 2." Further, a comparison of this Arabic numeral sequence to the Caller ID data identifies a match to the telephone number of the calling device. Thus, the originally-proposed output "seven ero for five five five hun to hun to" is replaced with the Arabic numeral sequence "7 0 4 5 5 5 1 2 1 2" from the Caller ID data.

In at least some embodiments, the Arabic numeral sequence from the Caller ID data may be substituted for a sequence of utterance fragments in the originally-proposed result even when possible results in the n-best list do not include all of the Arabic numerals in the sequence. More particularly, a partial sequence of, for example, six of the seven Arabic numerals in a seven-digit telephone number included in the Caller ID data, or nine of the ten Arabic numerals in a ten-digit telephone number included in the Caller ID data, may still be replaced with the Arabic numerals of the telephone number. It will be appreciated that the parameters for invoking this technique may be varied as desired, and in fact may be set by a user. For example, the process may be limited to analyze the proposed results only for 7-digit sequences, only for 10-digit sequences, only for 11-digit sequences, for 6-, 7- and 8-digit sequences, for 9-, 10- and 11-digit sequences, for 10-, 11- and 12-digit sequences, or for any combination thereof, and such selection in some embodiments may be set by the operator of the system 10 while in other embodiments may be set by the user 32,34 of the calling or receiving device 12,14.

Figure 8C:
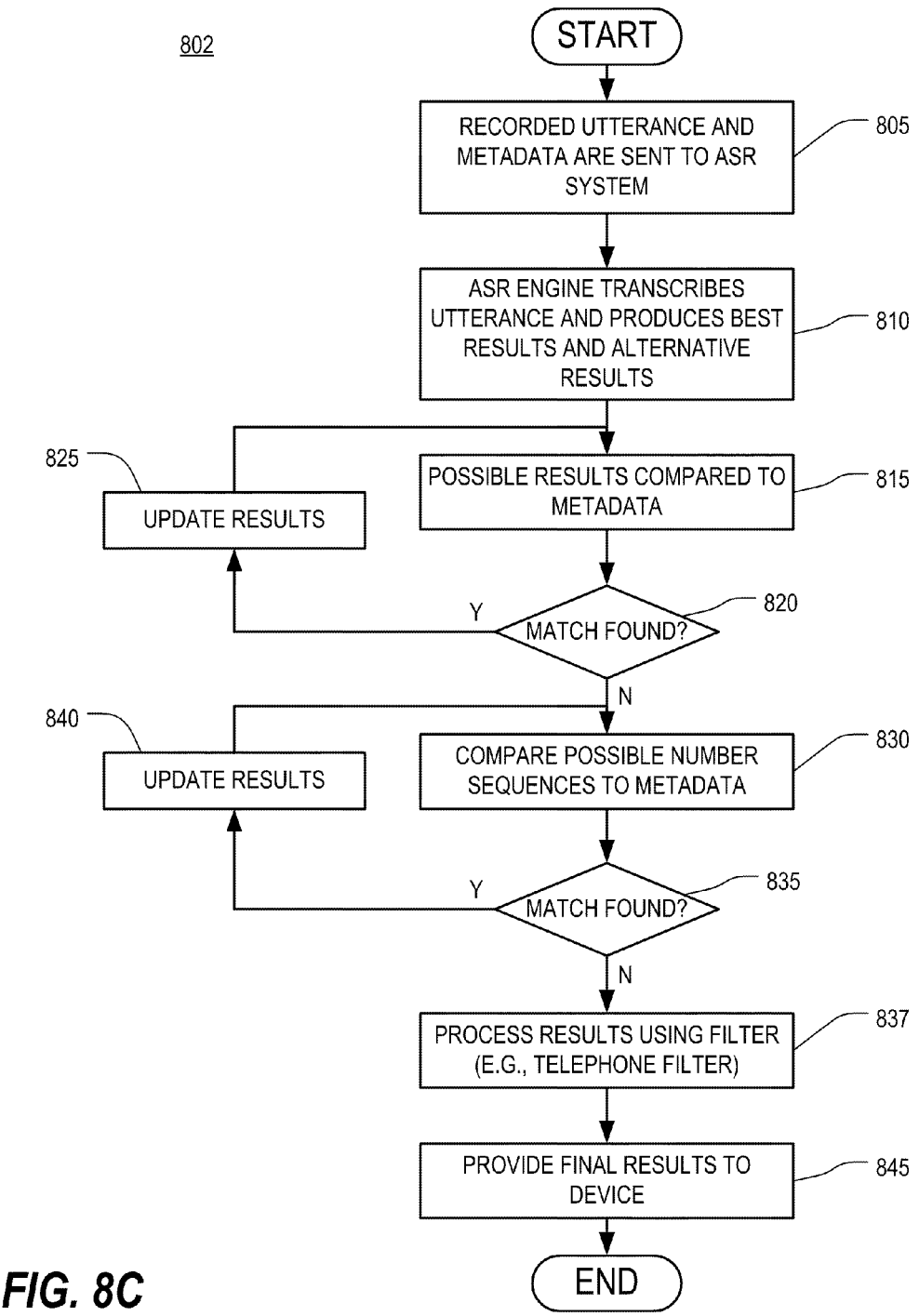
FIG. 8C is a high-level flowchart illustrating the operation of another such process.

In at least some embodiments, a sequence of utterance fragments that is recognized as a telephone number may still further be passed through a "Telephone Filter" where hyphens are added to a sequence of 7, 10 or 11 digits to correctly format the digits into a telephone number. The use of such a filter is illustrated in FIG. 8C at step 837. It will be appreciated that such a filter may be utilized whether or not there is a match between the number sequence output by the engine that was processed by the "Digit Filter" and the Caller ID or other metadata. If there is a metadata match, then the telephone number from the Caller ID data or other metadata is passed through the "Telephone Filter" to add hyphens and/or parentheses, and the result is substituted into the final proposed transcription result returned by the ASR system 18. If there is no metadata match, then the results processed by the "Digit Filter" are kept, are passed through the "Telephone Filter" to add hyphens and/or parentheses, and the result is incorporated into the final proposed transcription result returned by the ASR system 18.

After the methods described herein are completed, the following final output after processing results in a correctly formatted and more accurate result:

"Hello Harry, this is Jim Berger, just wanted to let you know we are on for Tuesday. Please call me back at 704-555-1212 when you get a chance."

At step 845, this result is then returned to the calling device 12 or recipient device 14, respectively. It will be appreciated that the complete transcribed utterance resulting from the processes described hereinabove may be presented to, and edited by, a user as described and illustrated with respect to FIGS. 6A-6E, at least with regard to text messages, and in corresponding manner with regard to voicemail and memo transcriptions.

It will be appreciated that the type and amount of metadata that is delivered to the ASR engine may be dependent on various factors. In implementations in which the ASR engine is located in the same device 12,14 that is making the transcription request, the metadata may be easily delivered and may include any data available to the device 12,14, including complete address book data and the like. On the other hand, it will be further appreciated that modern client devices 12,14 may store or otherwise have available address book data and other metadata that is quite substantial in size. Thus, in order to minimize communication delays and the like, it may be desired to transmit only a portion of the available metadata to the ASR engine for use in the transcription process. Preferences may be given, for example, to metadata associated with the most recent telephone calls made or received, to a subset of the metadata from an address book (such as only one name, one phone number, and one company name, when a plurality of names, phone numbers and/or company names are available), or to any other more subset of the metadata available to the device 12,14. Furthermore, some portion of the metadata may be stored in the ASR system 18 and updated on some appropriate basis, and then referenced when the device 12,14 associated with the metadata requests a transcription to occur.

Furthermore, the system 10 may gain the ability to use information about edits and corrections made by the user 32 to update the language models ("LMs") used by the ASR engine to produce the transcription, as described in U.S. patent application Ser. No. 12/407,502, filed Mar. 19, 2009, which is hereby incorporated herein by reference.

It will be appreciated that automated transcription of recorded utterances 36 is useful in other environments and applications as well. For example, in another system (not separately illustrated), a user speaks an utterance 36 into a device as a voicemail, and the recorded speech audio is sent to the ASR system 18. In another system, a system element that may or may not be associated directly with the ASR system 18 screens each word in a transcription for the availability of additional content associated with that word, and words for which content is available are enabled such that when one of the content-available words is spoken by the user, the ASR system 18 and/or other system elements recognize the spoken word and the additional content associated with that word is provided to the user, all in accordance with the disclosure of U.S. patent application Ser. No. 12/198,116, filed Aug. 25, 2008 and entitled "FACILITATING PRESENTATION BY MOBILE DEVICE OF ADDITIONAL CONTENT FOR A WORD OR PHRASE UPON UTTERANCE THEREOF," which, together with any corresponding patent application publications thereof, is incorporated herein by reference. Other applications to which the teachings of the present invention are applicable will be apparent to the Ordinary Artisan.

Commercial Implementation

One commercial implementation of the foregoing principles utilizes the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 10:
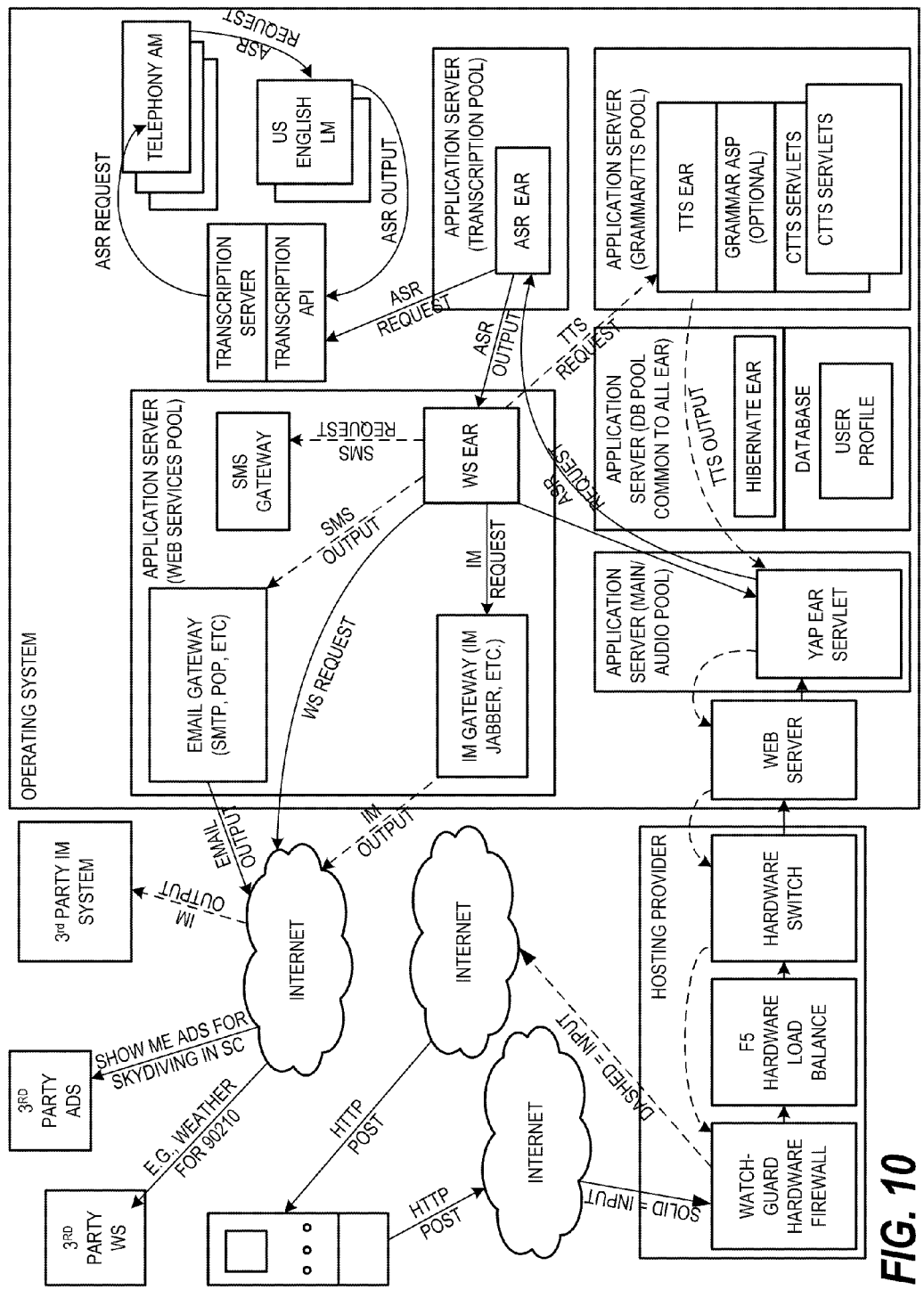
FIG. 10 is a block diagram of the system architecture of one commercial implementation.

FIG. 10 is a block diagram of the system architecture of the Yap commercial implementation. With reference to FIG. 10, the operating system may be implemented in Red Hat Enterprise Linux 5 (RHEL 5); the application servers may include the Websphere Application Server Community Edition (WAS-CE) servers, available from IBM; the web server may be an Apache server; the CTTS servlets may include CTTS servlets from Loquendo, including US/UK/ES male and US/UKIES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 11:
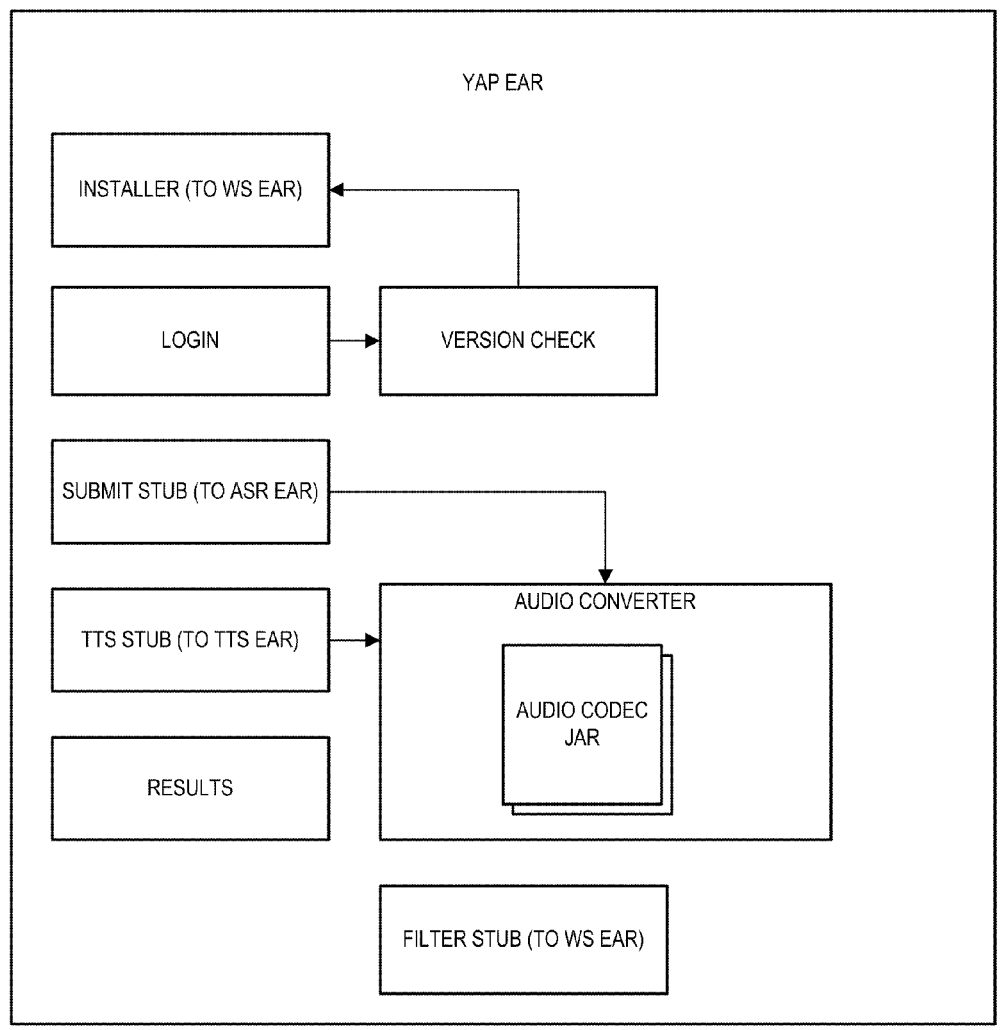
FIG. 11 is a block diagram of a portion of FIG. 10.

FIG. 11 is a block diagram of the Yap EAR of FIG. 10. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 12 is a typical header section of an HTTP request from the Yap client.

The Yap client is operated via a user interface (UT), known as "Yap9," which is well suited for implementing methods of converting an audio message into a text message and messaging in mobile environments. Yap9 is a combined UT for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 10A-10D, and accompanying text, of the aforementioned U.S. Patent Application Pub. No. US 2007/0239837.

Usage Process—Install: Installation of the Yap client device application is described in the aforementioned U.S. Patent Application Pub. No. US 2007/0239837 in a subsection titled "Install Process" of a section titled "System Architecture."

Usage Process—Notify: When a Yap client is installed, the install fails, or the install is canceled by the user, the Notify servlet is sent a message by the phone with a short description. This can be used for tracking purposes and to help diagnose any install problems.

Usage Process—Login: When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 13. An HTTP string pointing to a selected login server will be returned in response to this request. It will be appreciated that this selection process functions as a poor man's load balancer.

After receiving this response, a login request is sent. Exemplary protocol details for such a request can be seen in FIG. 14. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;
    jsessionid=C240B217F2351E3C420A599B0878371A

Usage Process—Submit: After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 15.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 1.

TABLE 1

| Filter Type | Function |
| --- | --- |
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" -> "$120.00") |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2 :)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results: The client retrieves the results of the audio by taking the receipt returned from the Submit servlet and submitting it as a request to the Results servlet. Exemplary protocol details for such a request can be seen in FIG. 16. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 17. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS: The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 18. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct: As a means of tracking accuracy and improving future SMS based language models, if the user makes a correction to transcribed text on the phone via the key elements of the key input unit 74 before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 19.

Usage Process—Ping: Typically, web sessions will timeout after a certain amount of inactivity. The Ping servlet can be used to send a quick message from the client to keep the session alive. Exemplary protocol details for such a message can be seen in FIG. 20.

Usage Process—Debug: Used mainly for development purposes, the Debug servlet sends logging messages from the client to a debug log on the server. Exemplary protocol details can be seen in FIG. 21.

Usage Process—Logout: To logout from the Yap server, an HTTP logout request needs to be issued to the server. An exemplary such request would take the form:

"/Yap/Logout;jsessionid=1234", where 1234 is the session ID.

User Preferences: In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer implemented method comprising:
as implemented by one or more computing devices configured with specific executable instructions,
receiving, via a data channel, an utterance from a device;
receiving metadata from the device, the metadata including one or more of: caller identification data, recipient identification data or address book data;
converting the utterance into a textual representation;
determining a plurality of alternative textual representations;
comparing each of the plurality of alternative textual representations to at least one portion of the metadata;
upon determining that there is a statistically significant match between at least one alternative textual representation and the at least one portion of the metadata:
replacing at least one portion of the textual representation with the at least one alternative representation determined to have the statistically significant match to create a converted textual representation, and
sending the converted textual representation to the device; and
upon determining that there is no statistically significant match between each of the plurality alternative textual representations and the at least one portion of the metadata, sending the textual representation to the device.

2. The computer-implemented method of claim 1, further comprising processing the converted textual representation of the utterance with a digit filter that substitutes Arabic numerals for words representing numbers.

3. The computer-implemented method of claim 1, further comprising processing the textual representation of the utterance with a digit filter that substitutes Arabic numerals for words representing numbers.

4. The computer-implemented method of claim 1, further comprising processing the converted textual representation of the utterance with a telephone filter that formats the Arabic numerals of a telephone number into a conventional format.

5. The computer-implemented method of claim 1, further comprising processing the textual representation of the utterance with a telephone filter that formats the Arabic numerals of a telephone number into a conventional format.

6. The computer-implemented method of claim 1, further comprising forwarding the converted textual representation to one or more recipients.

7. The computer-implemented method of claim 1, wherein the device is a mobile phone.

8. The computer-implemented method of claim 1, wherein converting the utterance into a textual representation comprises using grammar.

9. The computer-implemented method of claim 1, further comprising using a text-to-speech engine (TTS) to generate an audio message from the converted textual representation.

10. The computer-implemented method of claim 1, wherein the metadata comprises address book information.

11. The computer-implemented method of claim 1, wherein the metadata comprises calendar information.

12. The computer-implemented method of claim 1, wherein the metadata comprises data stored in different locations.

13. The computer-implemented method of claim 1, wherein the metadata comprises information about an incoming phone call.

14. The computer-implemented method of claim 1, wherein the metadata comprises ID data.

15. The computer-implemented method of claim 1, wherein the metadata comprises recipient ID data.

16. The method of claim 1, further comprising sending advertising to the device according to keywords contained in the converted textual representation, wherein the keywords are associated with the advertising.

17. The computer-implemented method of claim 1, further comprising receiving a geospatial position of the device.

18. The computer-implemented method of claim 17, further comprising sending locations, proximate to the position of the device, of a target of interest according to keywords contained in the converted textual representation.

19. The computer-implemented method of claim 1, further comprising receiving login information.

20. The computer-implemented method of claim 1, wherein the metadata is identifying data.

21. The computer-implemented method of claim 1, wherein a meaning of the converted textual representation is different from a meaning of the textual representation.

22. The computer-implemented method of claim 1, wherein the at least one portion of the metadata represents at least one word that is not represented by the at least one portion of the textual representation.

23. A system comprising:
a computing device configured to:
initialize the computing device to communicate with a server;
receive an utterance;
transmit the utterance to the server;
transmit metadata to the server, the metadata including one or more of:
caller identification data, recipient identification data or address book data; and the server configured to:
convert the utterance into a textual representation;
determine a plurality of alternative textual representations;
compare each of the plurality of alternative textual representations to at least one portion of the metadata;
upon determining that there is a statistically significant match between at least one alternative textual representation and the at least one portion of the metadata:
replace at least one portion of the textual representation with the at least one alternative textual representation determined to have the statistically significant match to create a converted textual representation, and
send the converted textual representation to the computing device; and
upon determining that there is no statistically significant match between each of the plurality alternative textual representations and the at least one portion of the metadata, send the textual representation to the device.

24. The system of claim 23, wherein the server is further configured to process the converted textual representation of the utterance with a digit filter that substitutes Arabic numerals for words representing numbers.

25. The system of claim 23, wherein the server is further configured to process the textual representation of the utterance with a digit filter that substitutes Arabic numerals for words representing numbers.

26. The system of claim 23, wherein the server is further configured to process the converted textual representation of the utterance with a telephone filter that formats the Arabic numerals of a telephone number into a conventional format.

27. The system of claim 23, wherein the server is further configured to process the textual representation of the utterance with a telephone filter that formats the Arabic numerals of a telephone number into a conventional format.

28. The system of claim 23, wherein the server is further configured to forward the converted textual representation to one or more recipients.

29. The system of claim 23, wherein the computing device is a mobile phone.

30. The system of claim 23, wherein the server is configured to convert the utterance into a textual representation using grammar.

31. The system of claim 23, wherein the server is further configured to use a text-to-speech engine (TTS) to generate an audio message from the converted textual representation.

32. The system of claim 23, wherein the metadata comprises at least one of address book information, calendar information, data stored in different locations, information about an incoming phone call, caller ID data, and recipient ID data.

33. The system of claim 23, wherein the server is further configured to receive a geospatial position of the computing device.

34. The system of claim 33, wherein the server is further configured to send locations, proximate to the geospatial position of the device, of a target of interest according to keywords contained in the textual representation.

35. The system of claim 23, wherein the server includes a filter selected from the group consisting of an ad filter, an SMS filter, an obscenity filter, a number filter, a date filter, and a currency filter.

36. The system of claim 23, wherein a meaning of the converted textual representation is different from a meaning of the textual representation.

37. A non-transitory computer-readable medium having a computer-executable component, the computer-executable component comprising:
a server component operative to:
communicate with a computing device, wherein the computing device receives an utterance and transmits the utterance and metadata to the server component;
convert the utterance into a textual representation;
determine a plurality of alternative textual representations;
compare each of the plurality of alternative textual representations to at least one portion of the metadata;
upon determining that there is a statistically significant match between at least one alternative textual representation and the at least one portion of the metadata:
replace at least one portion of the textual representation with the at least one alternative textual representation determined to have the statistically significant match to create a converted textual representation, and
send the converted textual representation to the computing device; and
upon determining that there is no statistically significant match between each of the plurality alternative textual representations and the at least one portion of the metadata, send the textual representation to the device.

38. The non-transitory computer-readable medium of claim 37, wherein the server component is further operative to process the converted textual representation of the utterance with a digit filter that substitutes Arabic numerals for words representing numbers.

39. The non-transitory computer-readable medium of claim 37, wherein the server component is further operative to process the textual representation of the utterance with a digit filter that substitutes Arabic numerals for words representing numbers.

40. The non-transitory computer-readable medium of claim 37, wherein the server component is further operative to process the converted textual representation of the utterance with a telephone filter that formats the Arabic numerals of a telephone number into a conventional format.

41. The non-transitory computer-readable medium of claim 37, wherein the server component is further operative to process the textual representation of the utterance with a telephone filter that formats the Arabic numerals of a telephone number into a conventional format.

42. The non-transitory computer-readable medium of claim 37, wherein the server component is further operative to forward the converted textual representation to one or more recipients.

43. The non-transitory computer-readable medium of claim 37, wherein the server component is operative to convert the utterance into a textual representation using grammar.

44. The non-transitory computer-readable medium of claim 37, wherein the server component is further operative to use a text-to-speech engine (TTS) to generate an audio message from the converted textual representation.

45. The non-transitory computer-readable medium of claim 37, wherein the metadata comprises at least one of address book information, calendar information, data stored in different locations, information about an incoming phone call, caller ID data and recipient ID data.

46. The non-transitory computer-readable medium of claim 37, wherein the server component is further operative to receive a geospatial position of the computing device.

47. The non-transitory computer-readable medium of claim 46, wherein the server component is further operative to send locations, proximate to the geospatial position of the device, of a target of interest according to keywords contained in the textual representation.

48. The non-transitory computer-readable medium of claim 37, wherein the server component includes a filter selected from the group consisting of an ad filter, an SMS filter, an obscenity filter, a number filter, a date filter, and a currency filter.

49. The non-transitory computer-readable medium of claim 37, wherein a meaning of the converted textual representation is different from a meaning of the textual representation.

* * * * *

UNITED STATES PATENT AND TRADEMARK OFFICE
CERTIFICATE OF CORRECTION

PATENT NO. : 8,676,577 B2
APPLICATION NO. : 12/415874
DATED : March 18, 2014
INVENTOR(S) : Igor Roditis Jablokov et al.

Page 1 of 1

It is certified that error appears in the above-identified patent and that said Letters Patent is hereby corrected as shown below:

On the title page, (Item 75, Inventors) Change "Victor Roditis Jablokov" to --Victor Roman Jablokov--.

Signed and Sealed this
Fifth Day of July, 2016

Michelle K. Lee
*Director of the United States Patent and Trademark Office*